Figure 18:
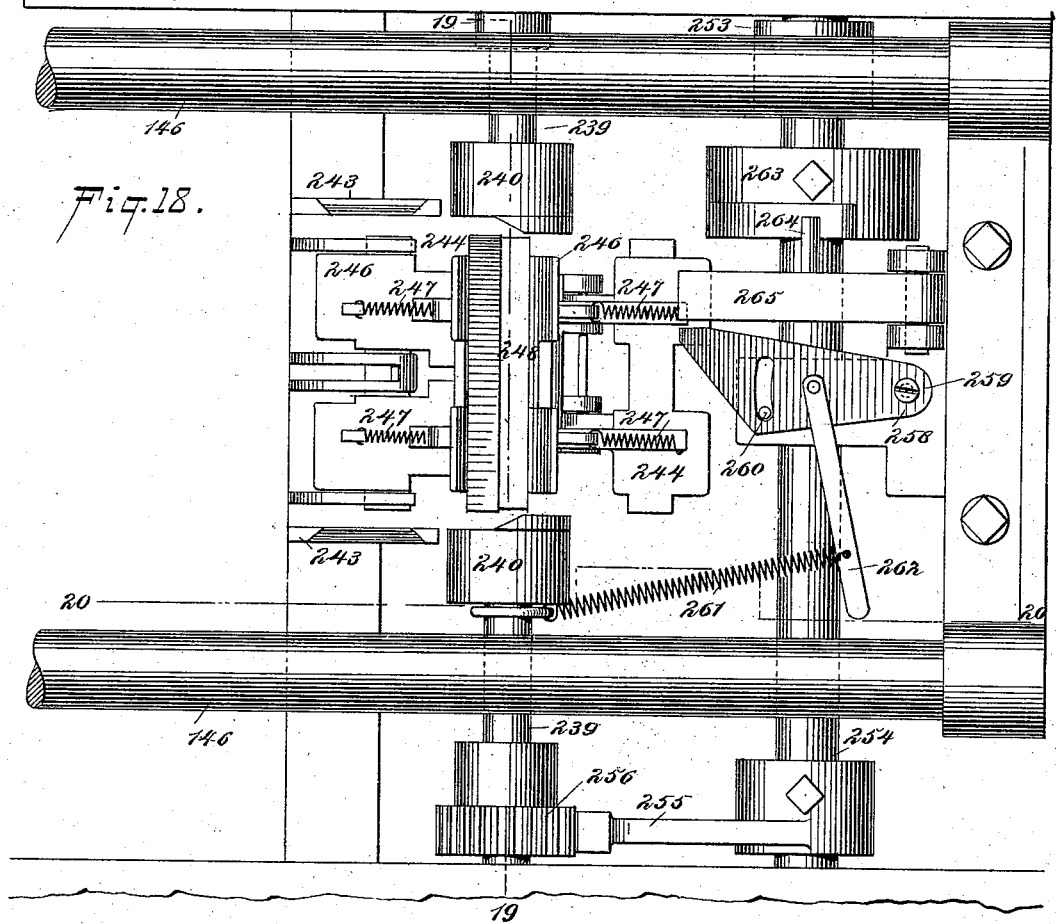

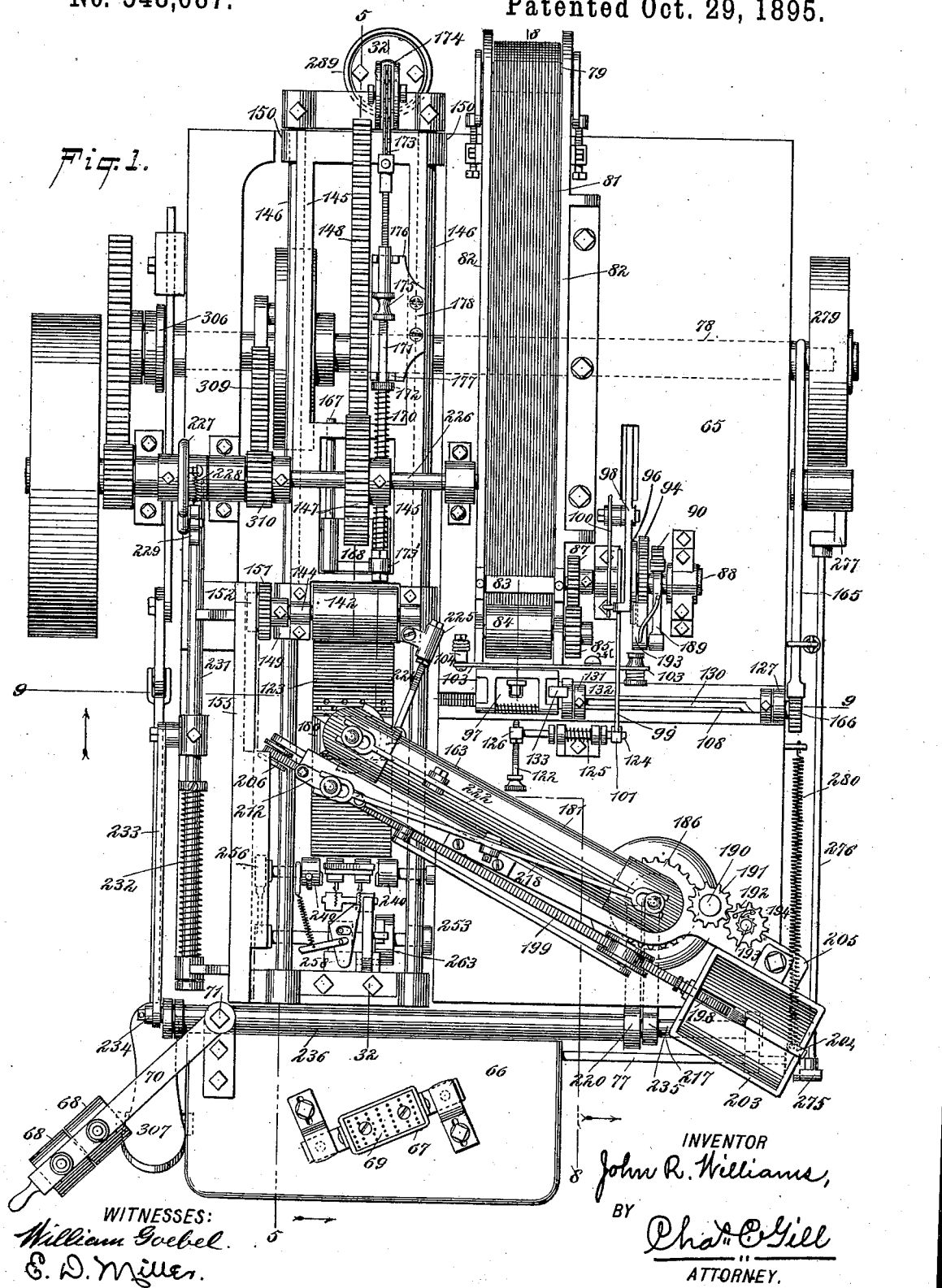

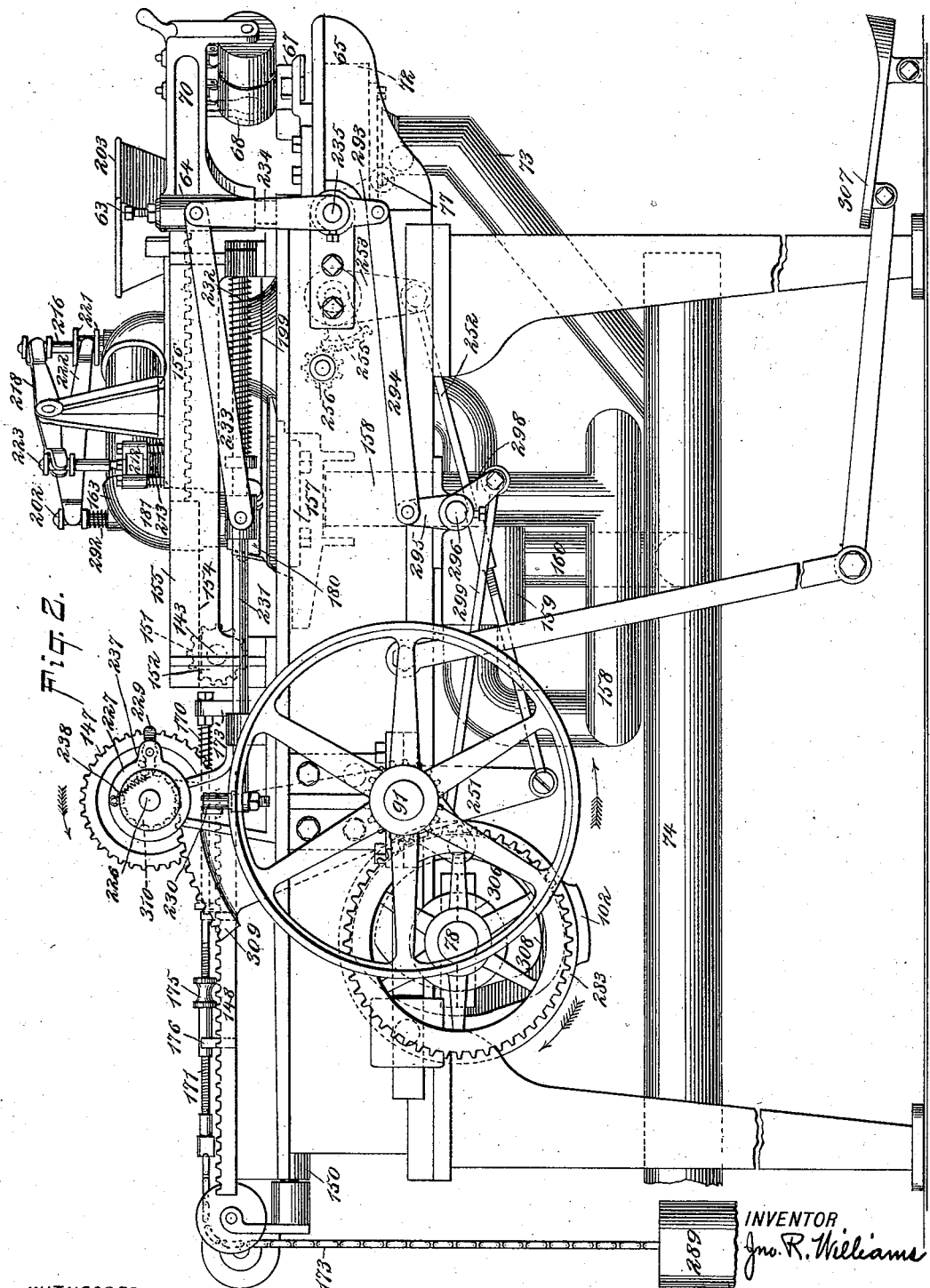

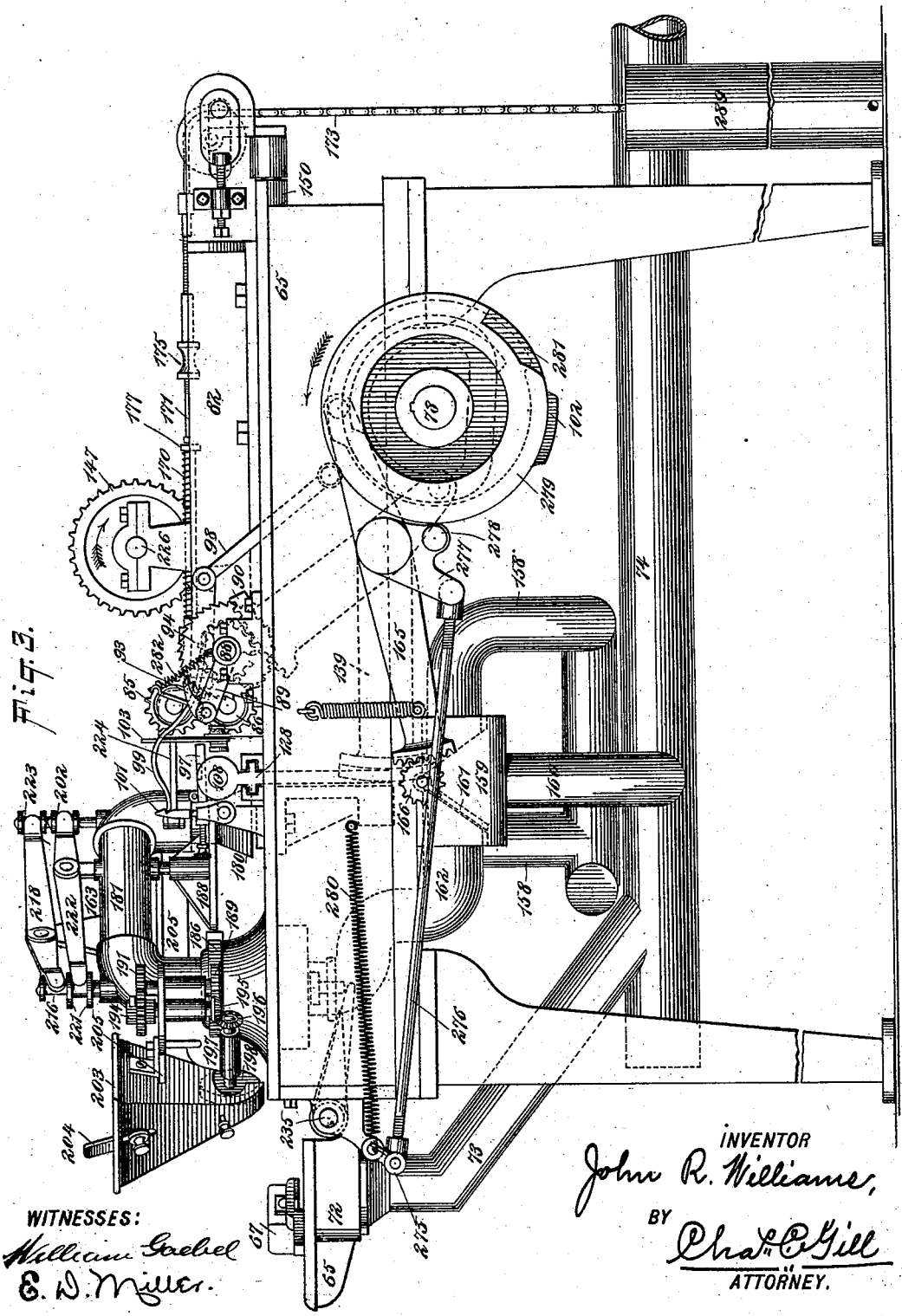

(No Model.) 20 Sheets—Sheet 4.
J. R. WILLIAMS.
CIGARETTE MACHINE.
No. 548,687. Patented Oct. 29, 1895.
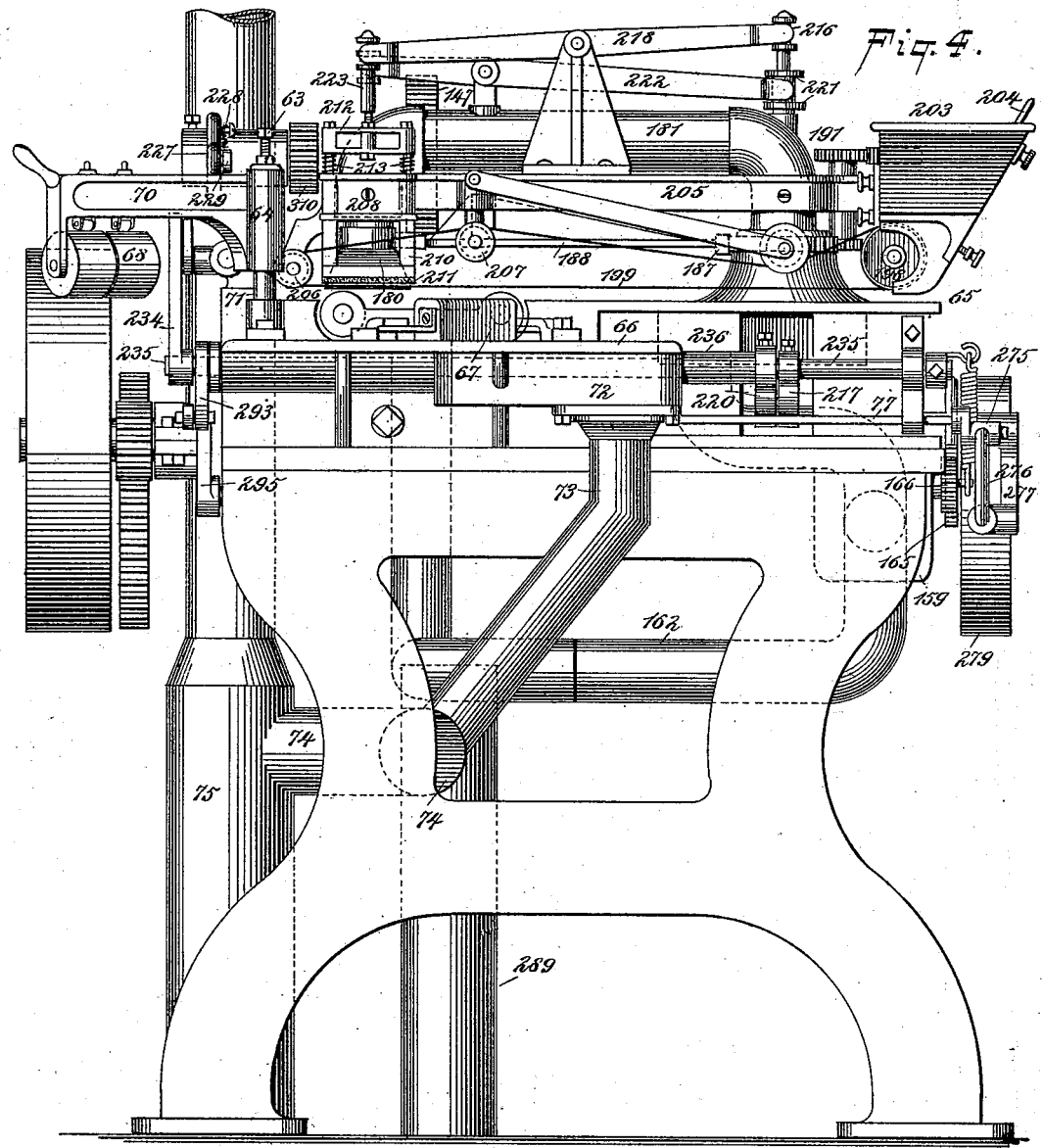
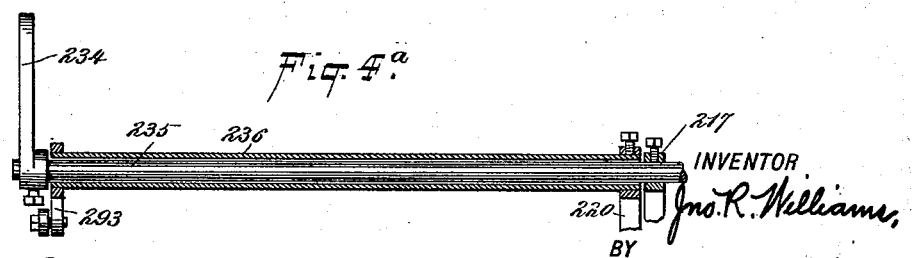
WITNESSES:
William Goebel
E. D. Miller.
INVENTOR
Jno. R. Williams,
BY
Chas. O. Gill
ATTORNEY.

(No Model.) 20 Sheets—Sheet 5.
J. R. WILLIAMS.
CIGARETTE MACHINE.

No. 548,687. Patented Oct. 29, 1895.

Fig. 5.

WITNESSES:
William Gaebel
E. D. Miller.

INVENTOR John R. Williams,
BY Chas. E. Gill ATTORNEY.

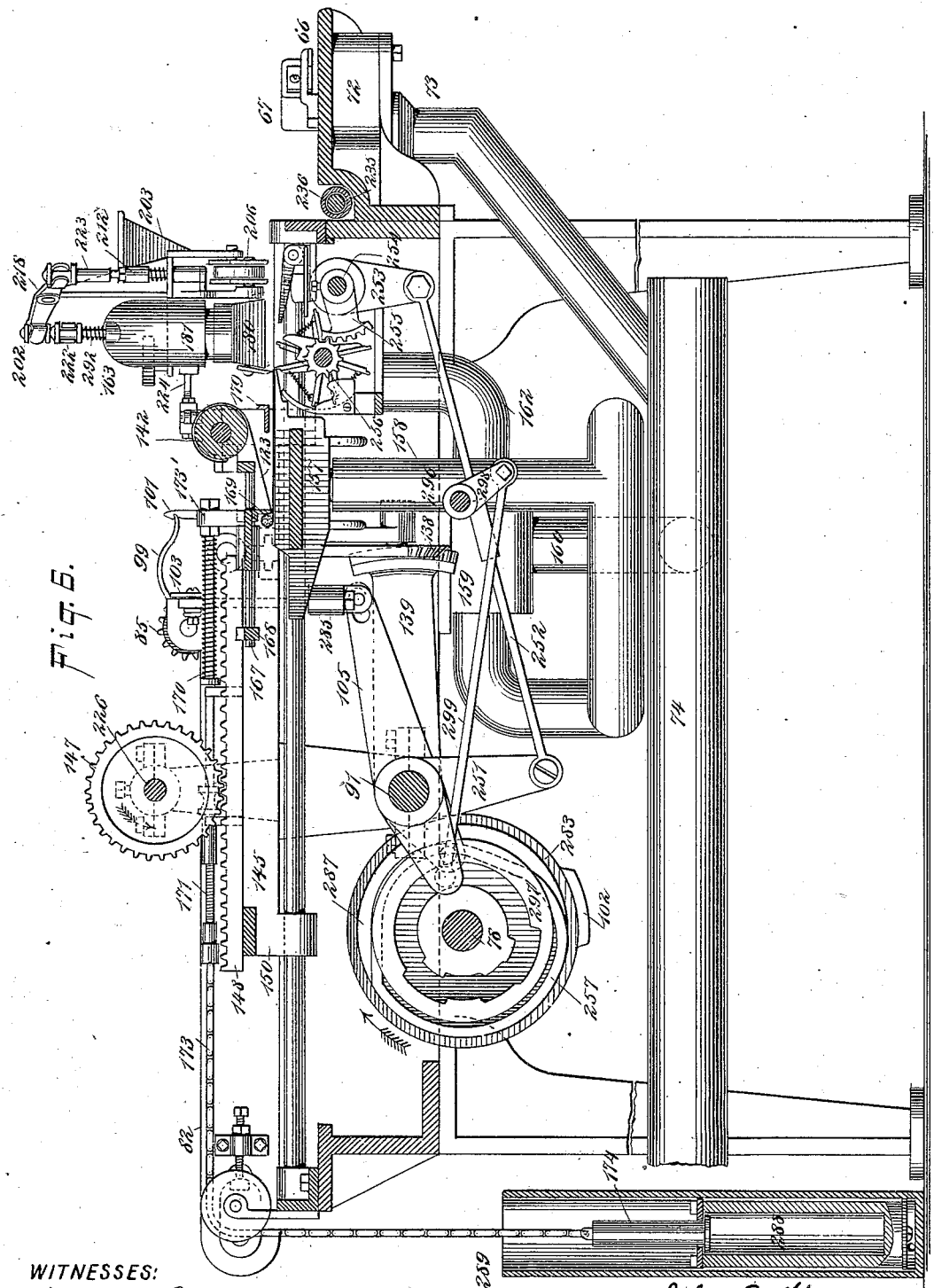

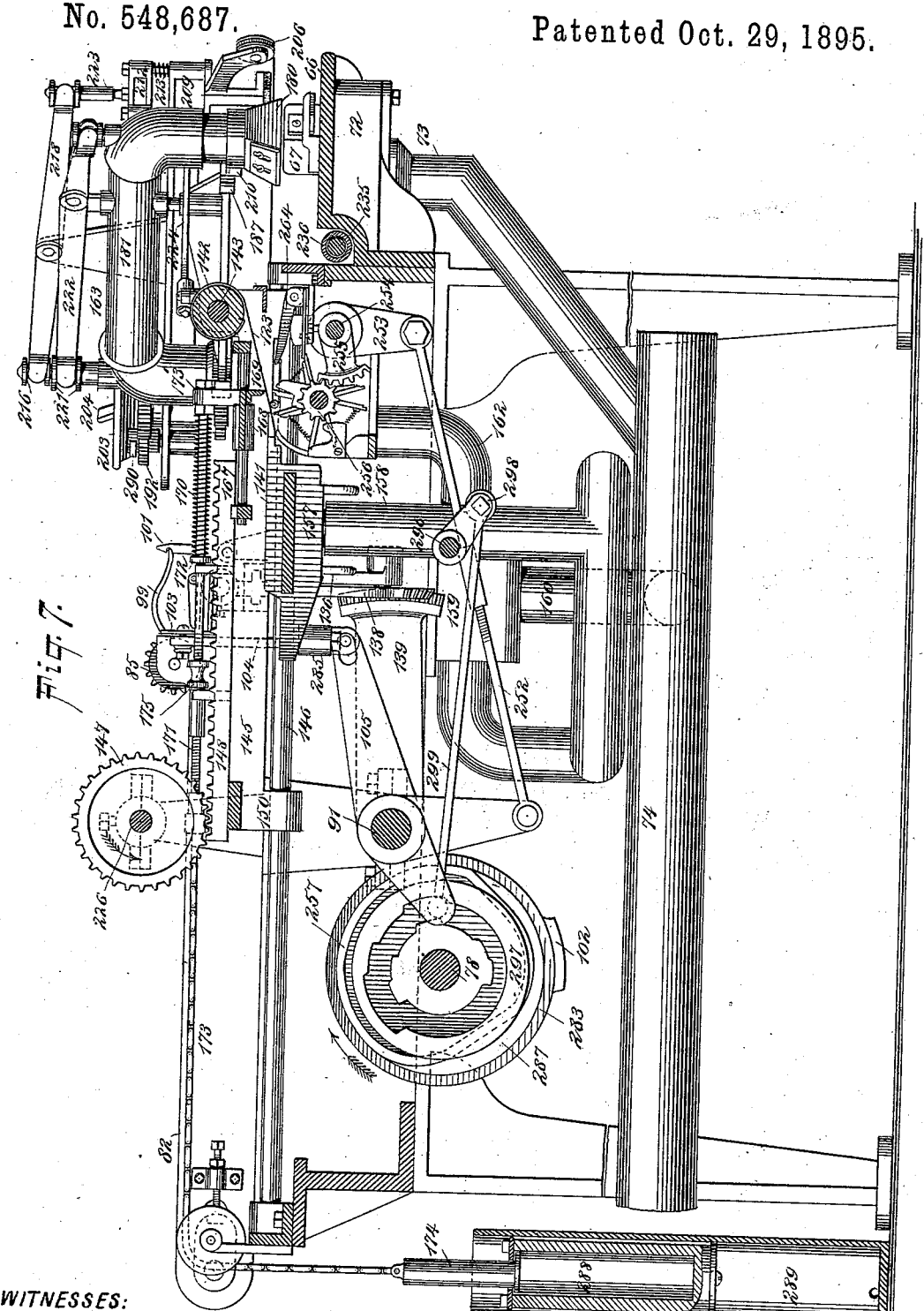

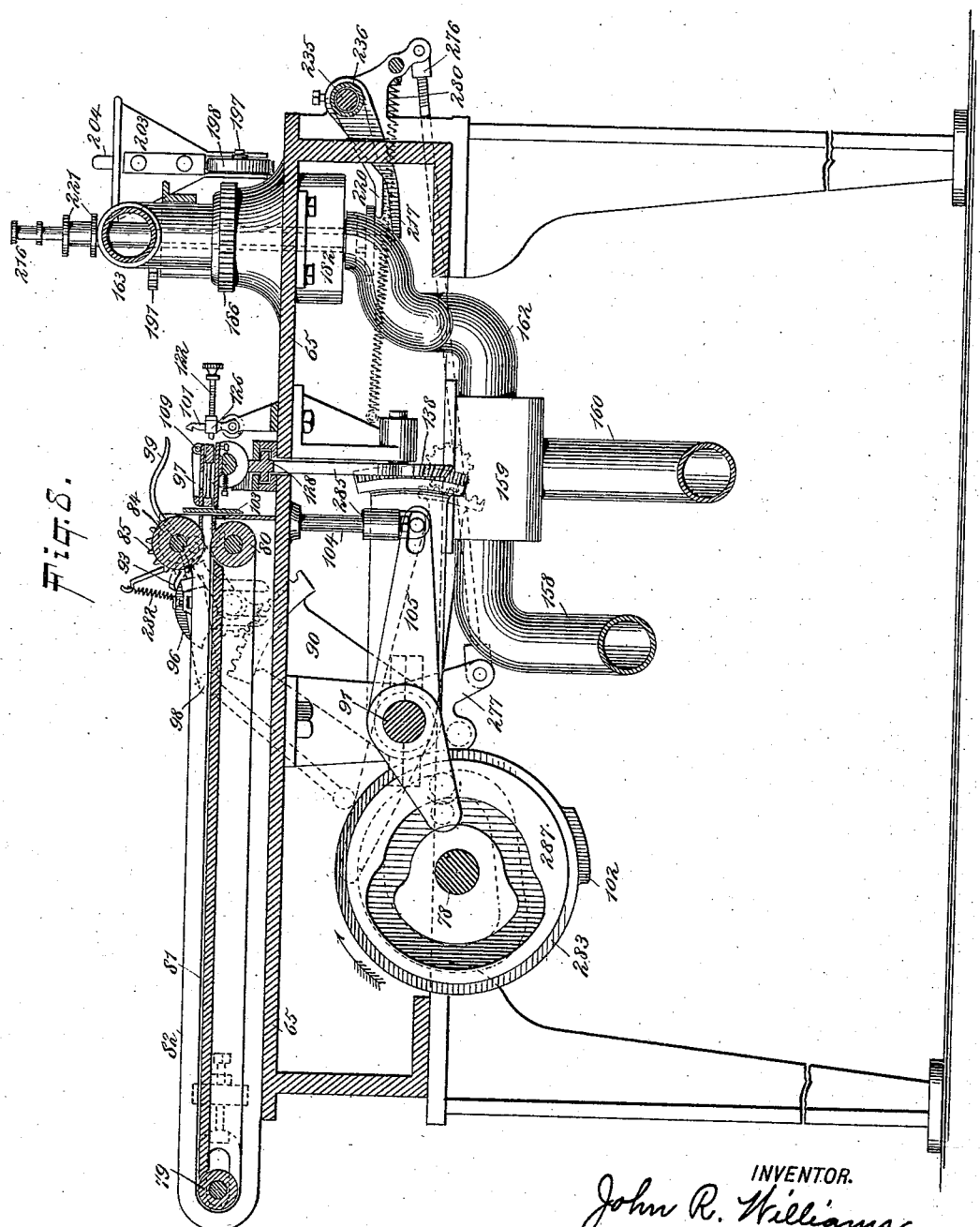

(No Model.) 20 Sheets—Sheet 9.
J. R. WILLIAMS.
CIGARETTE MACHINE.
No. 548,687. Patented Oct. 29, 1895.
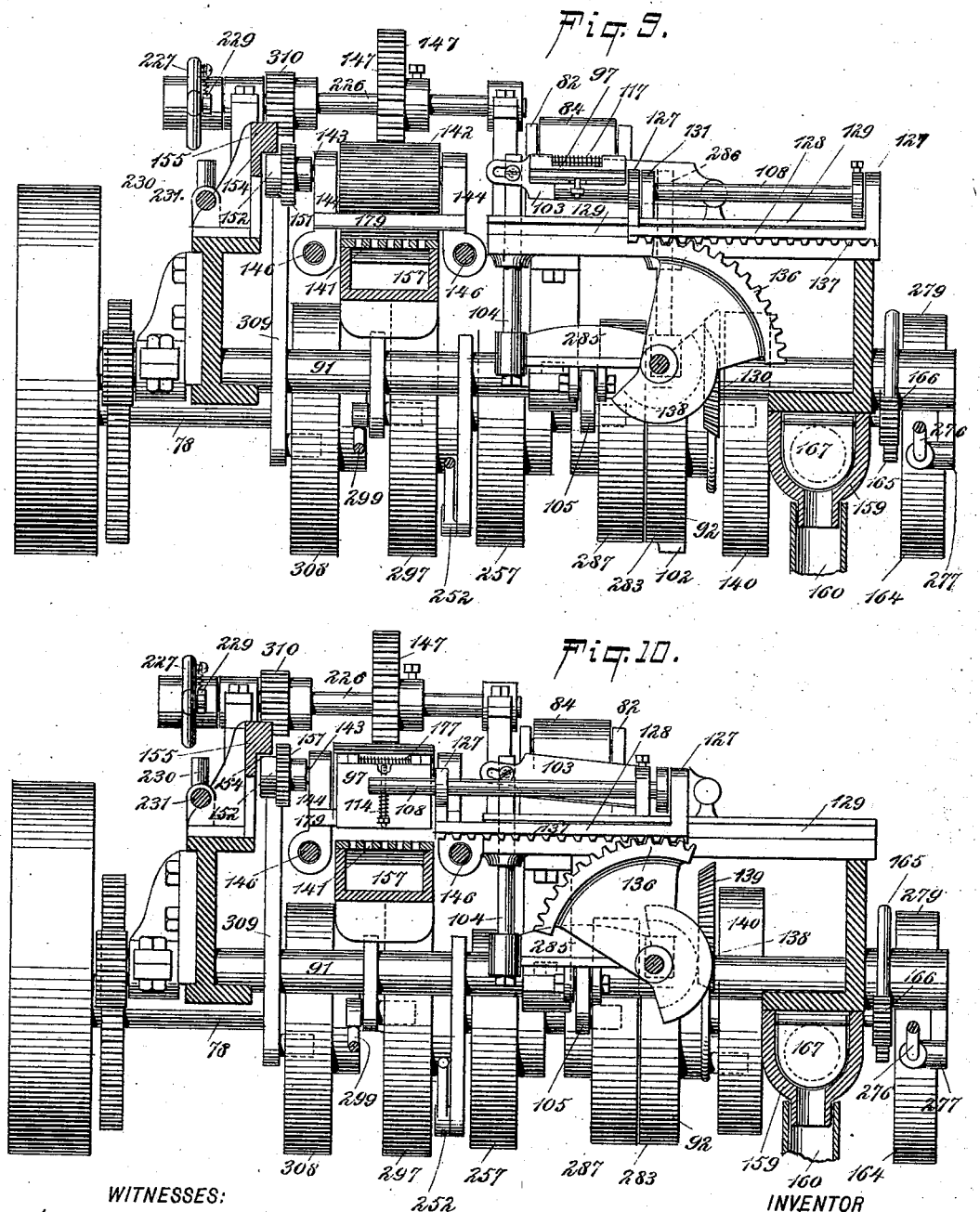
WITNESSES:
William Gaebel
E. D. Miller.
INVENTOR
John R. Williams,
BY
Chas. C. Gill
ATTORNEY (No Model.) 20 Sheets—Sheet 10.
J. R. WILLIAMS.
CIGARETTE MACHINE.
No. 548,687. Patented Oct. 29, 1895.
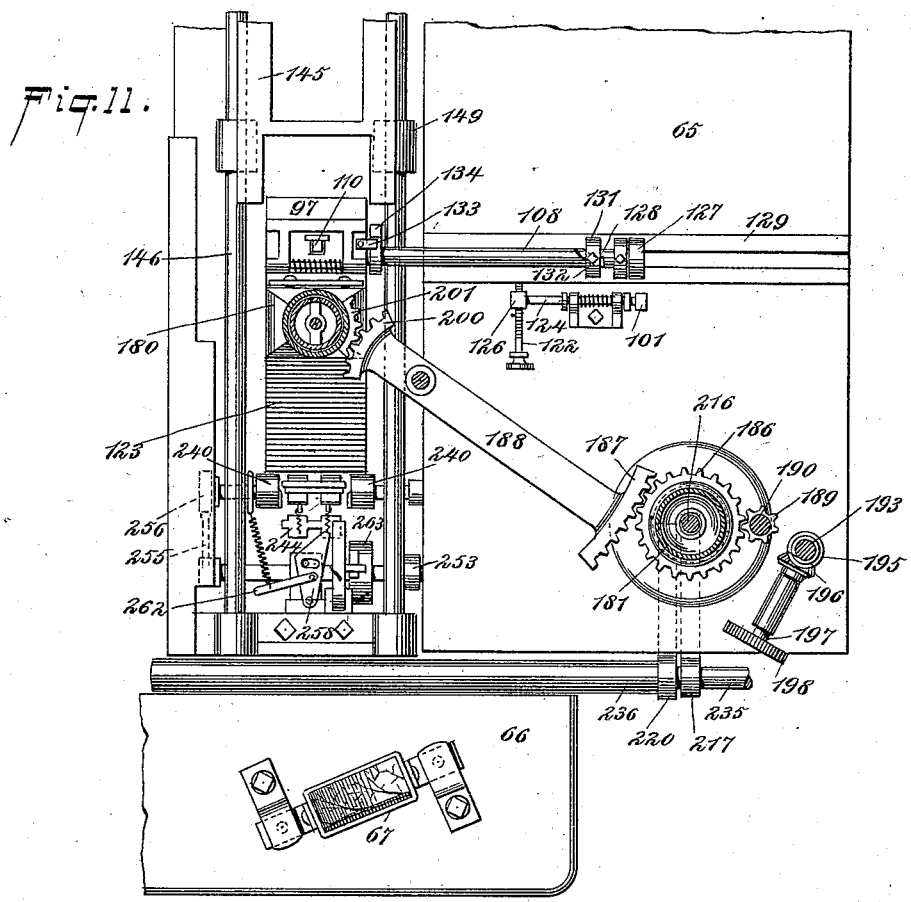
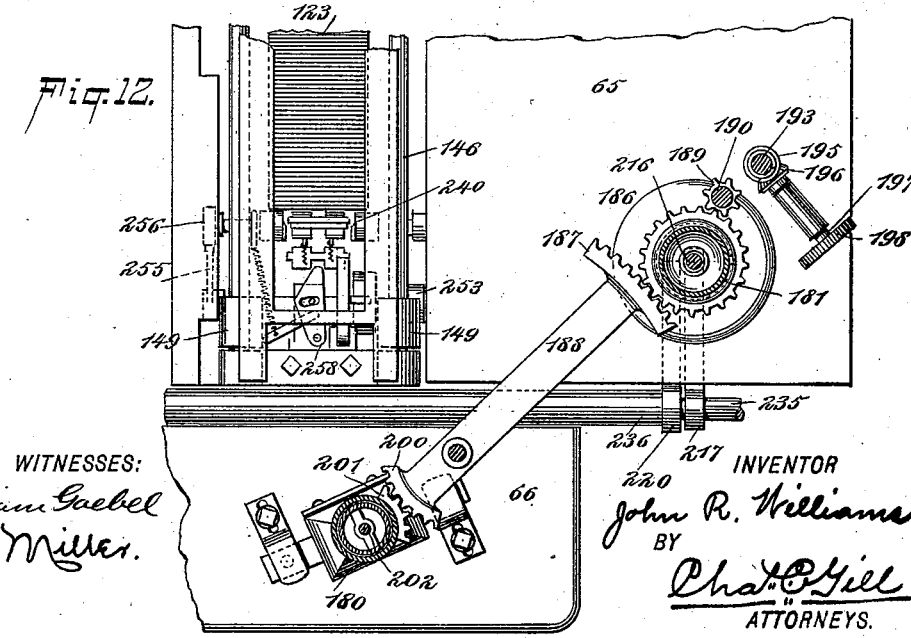
WITNESSES:
William Gaebel
E. D. Miller.
INVENTOR
John R. Williams,
BY
Chas. C. Gill
ATTORNEYS.

(No Model.) 20 Sheets—Sheet 11.
J. R. WILLIAMS.
CIGARETTE MACHINE.
No. 548,687. Patented Oct. 29, 1895.
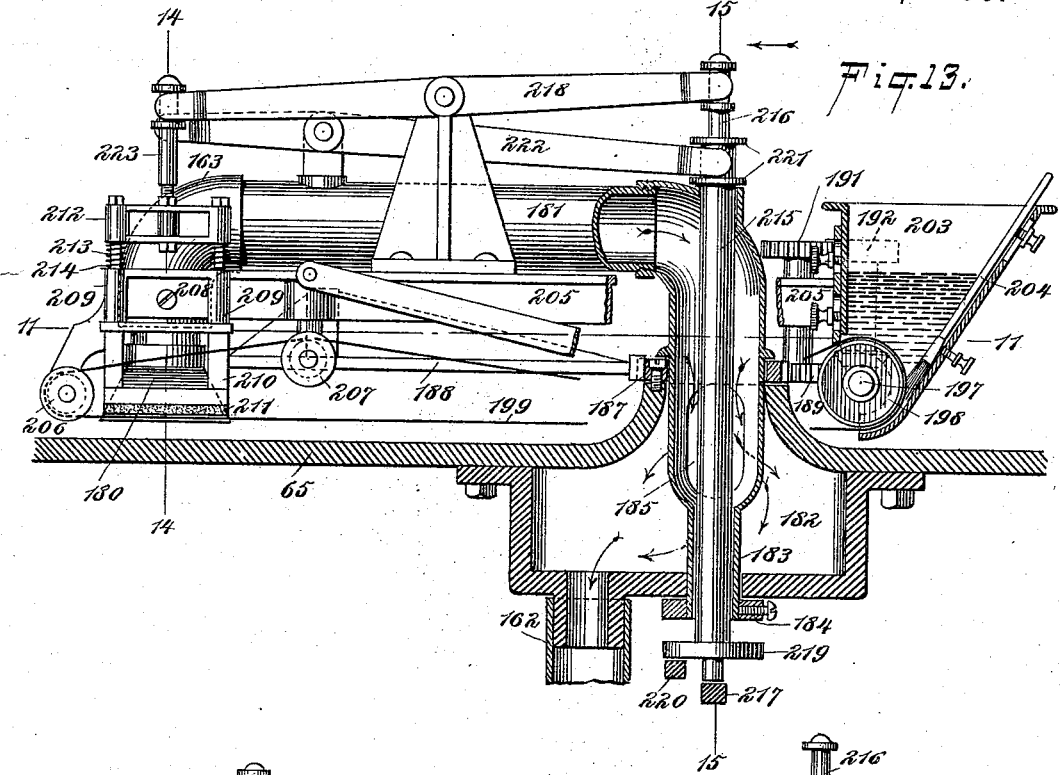
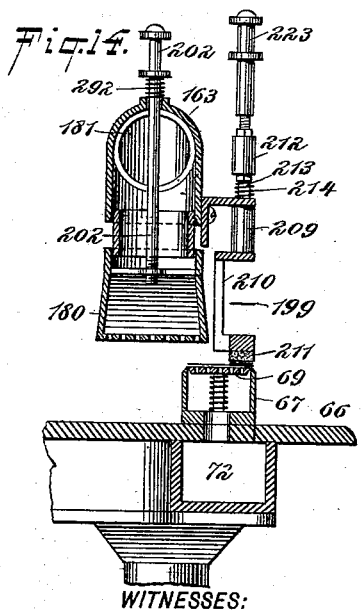
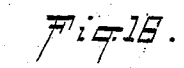
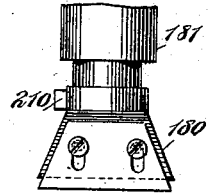
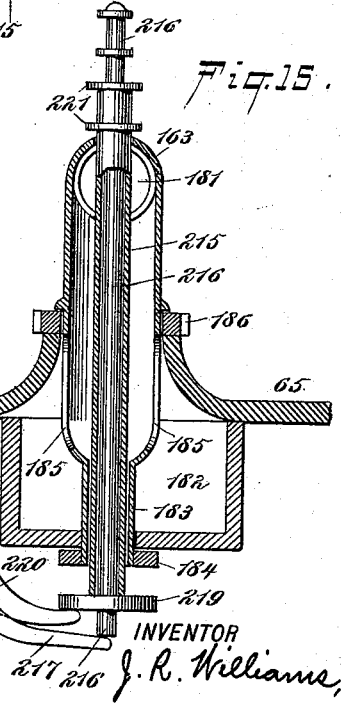
WITNESSES:
William Gaebel.
E. D. Miller.
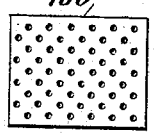
INVENTOR
J. R. Williams,
BY
Chas. E. Gill
ATTORNEY.

(No Model.) 20 Sheets—Sheet 12.

J. R. WILLIAMS.
CIGARETTE MACHINE.

No. 548,687. Patented Oct. 29, 1895.

WITNESSES:
William Goebel
E. D. Miller.

INVENTOR
John R. Williams,
BY
Chas. C. Gill
ATTORNEY.

(No Model.) 20 Sheets—Sheet 13.
J. R. WILLIAMS.
CIGARETTE MACHINE.
No. 548,687. Patented Oct. 29, 1895.
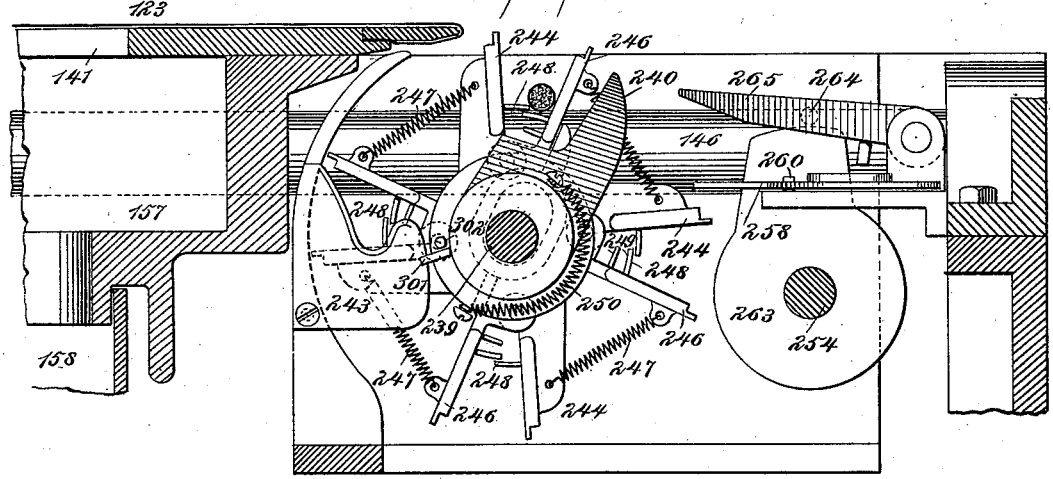
Fig. 20.
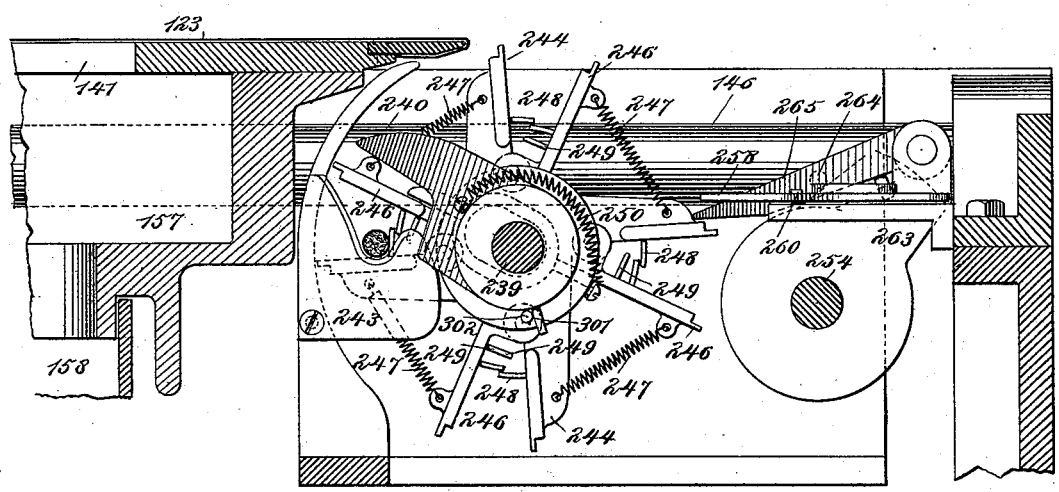
Fig. 21.
Fig. 22
WITNESSES:
William Goebel
E. D. Millar.
INVENTOR
John R. Williams,
BY Chas. E. Gill
ATTORNEY.

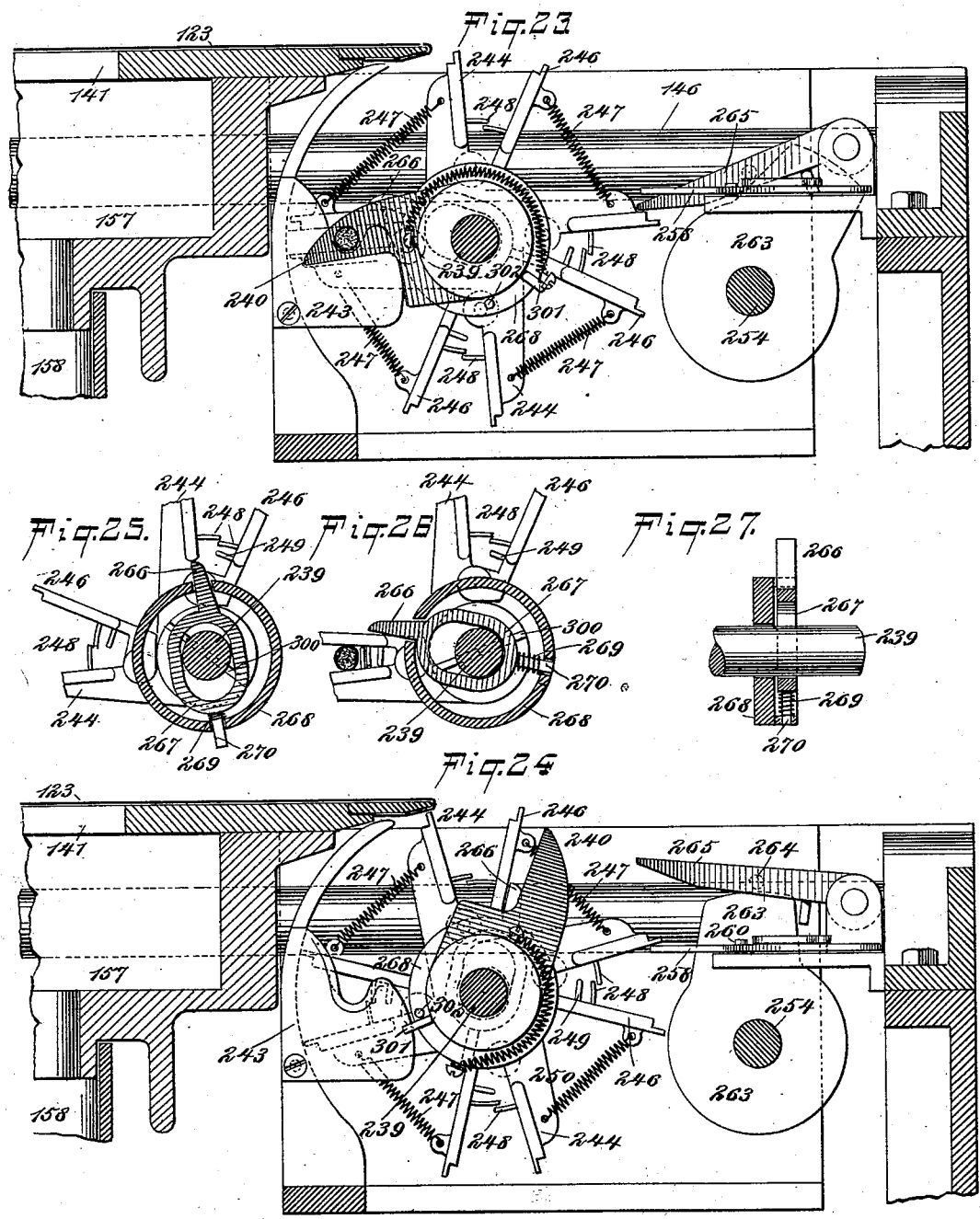

(No Model.) 20 Sheets—Sheet 15.
J. R. WILLIAMS.
CIGARETTE MACHINE.
No. 548,687. Patented Oct. 29, 1895.
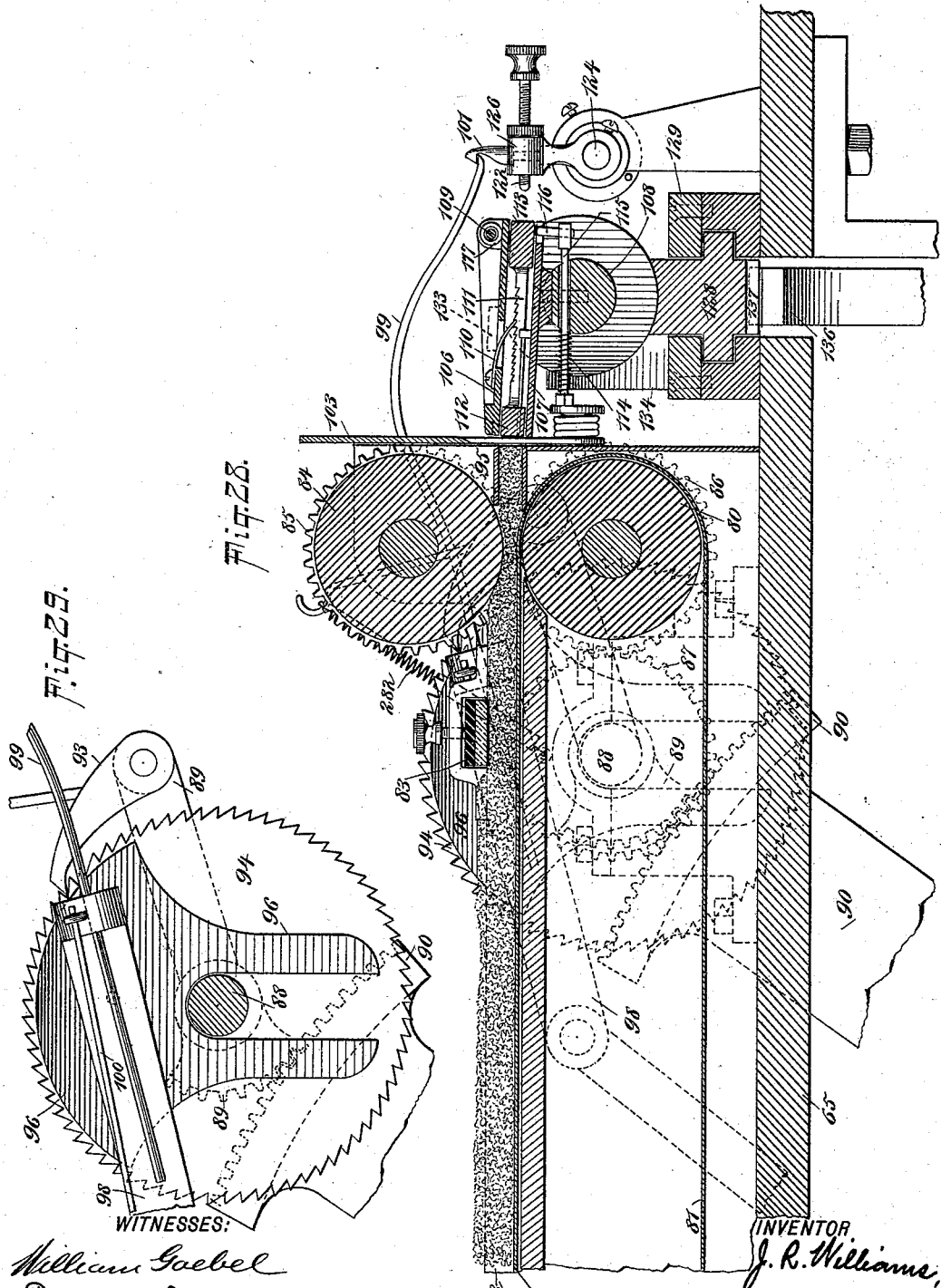

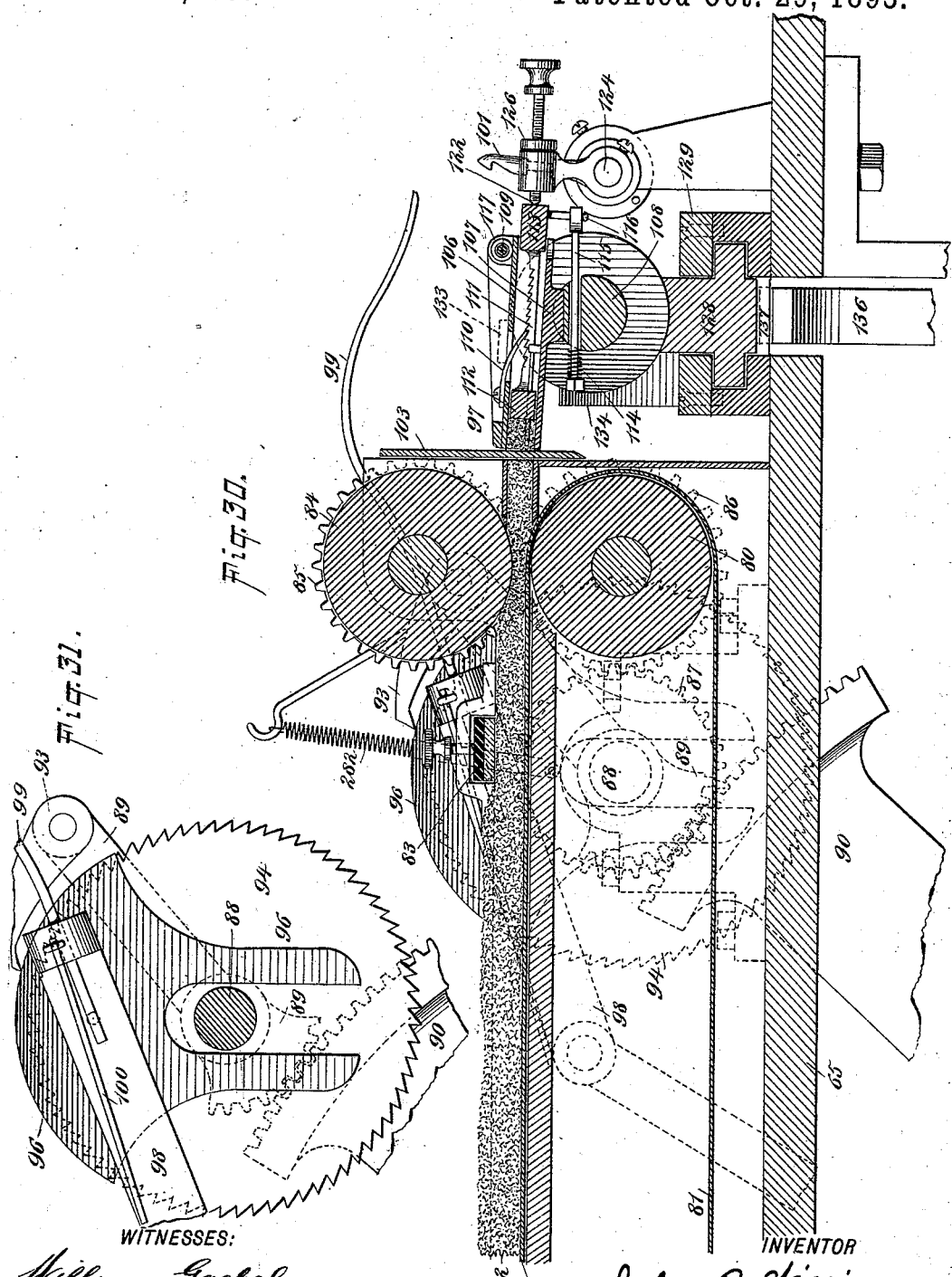

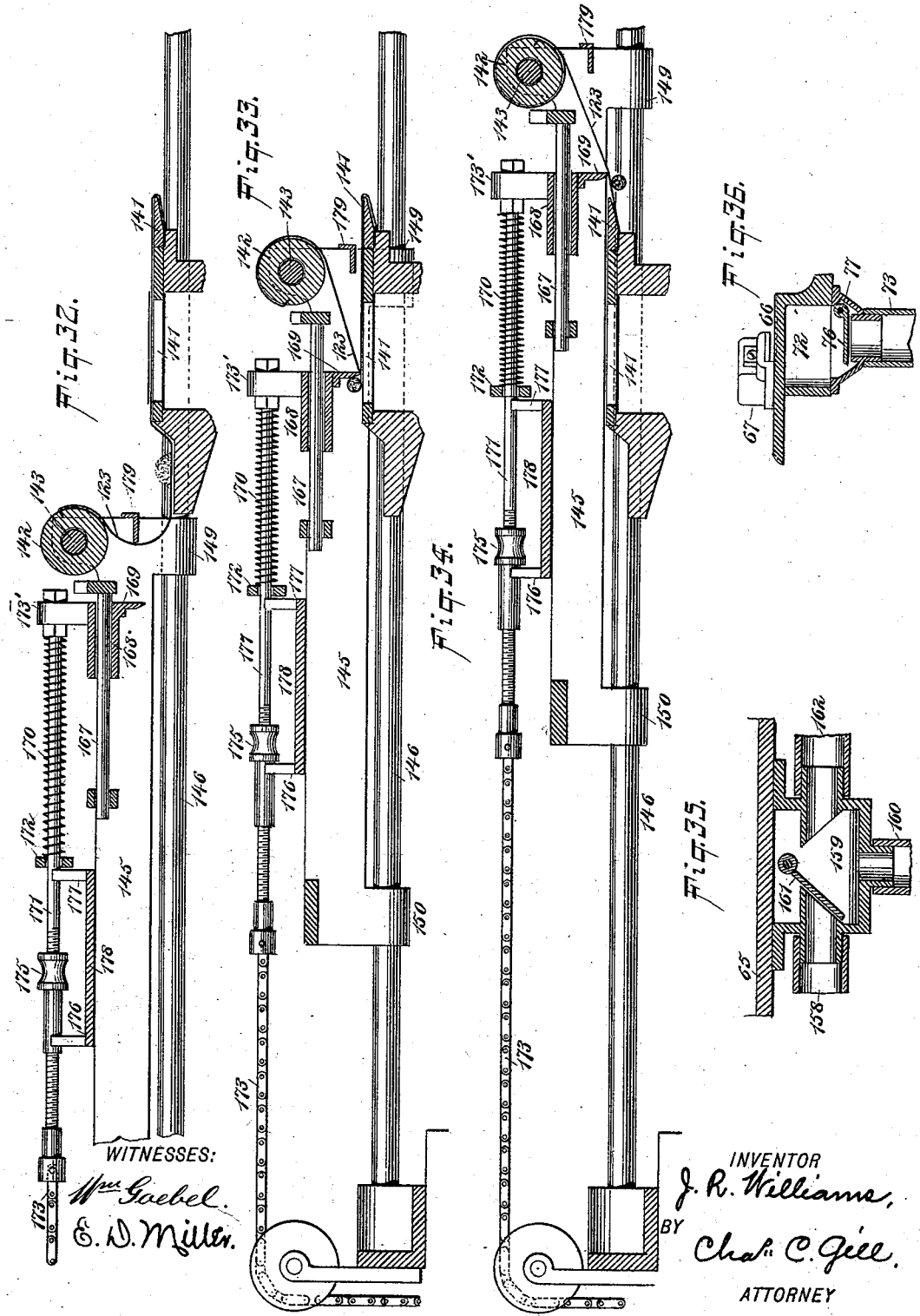

(No Model.)   20 Sheets—Sheet 18.
J. R. WILLIAMS.
CIGARETTE MACHINE.
No. 548,687.  Patented Oct. 29, 1895.
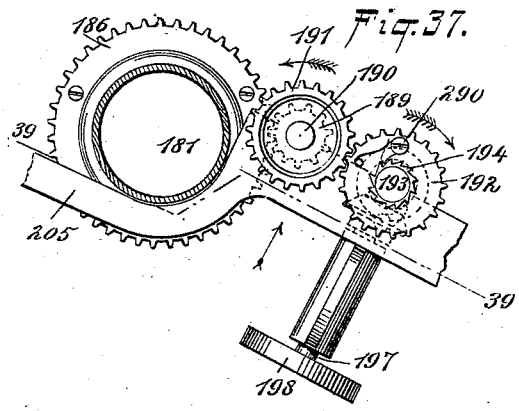
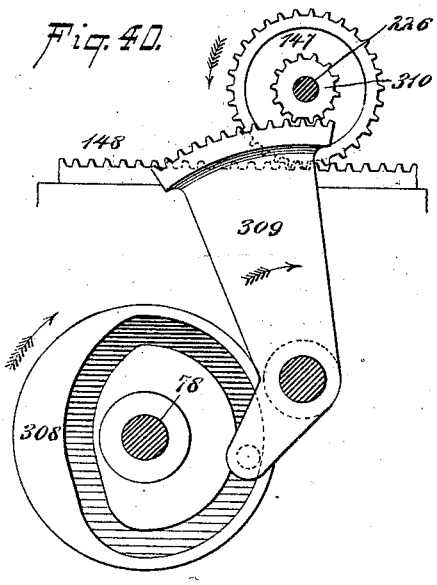
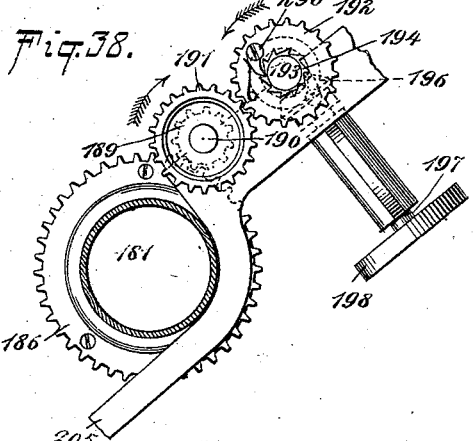
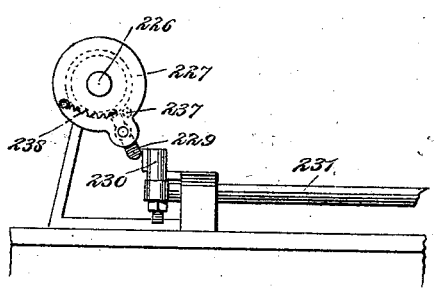
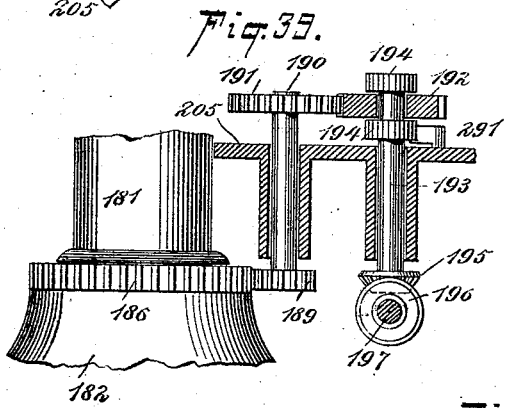
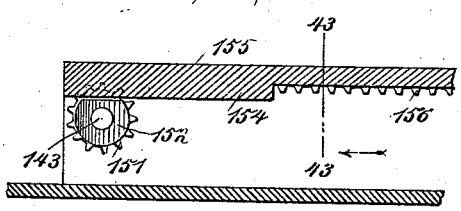
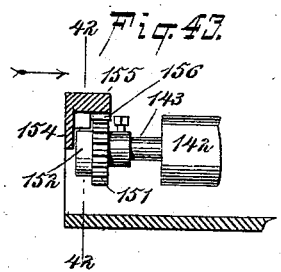
WITNESSES:
William Goebel.
E. D. Miller.
INVENTOR
John R. Williams,
BY
Chas. C. Gill
ATTORNEY.

(No Model.)  20 Sheets—Sheet 19.
J. R. WILLIAMS.
CIGARETTE MACHINE.
No. 548,687.  Patented Oct. 29, 1895.
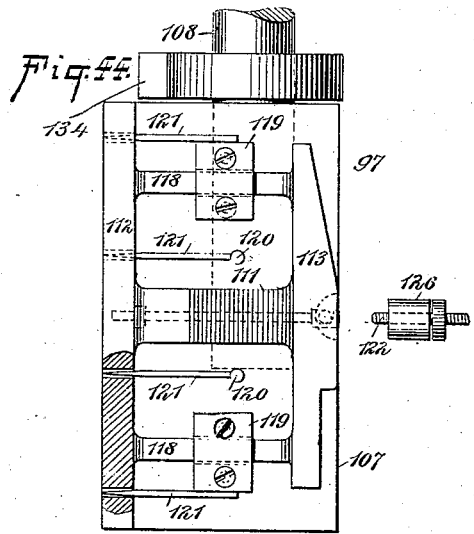
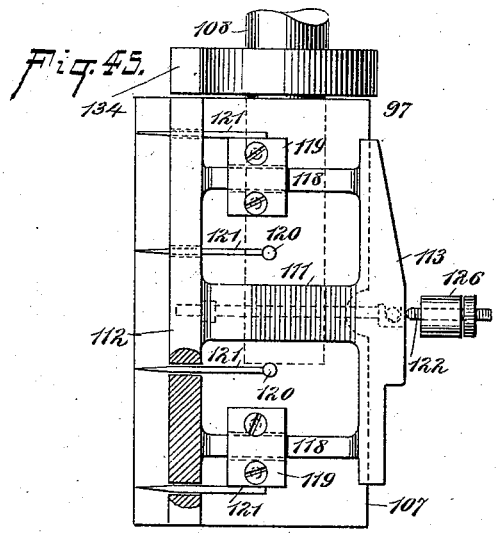
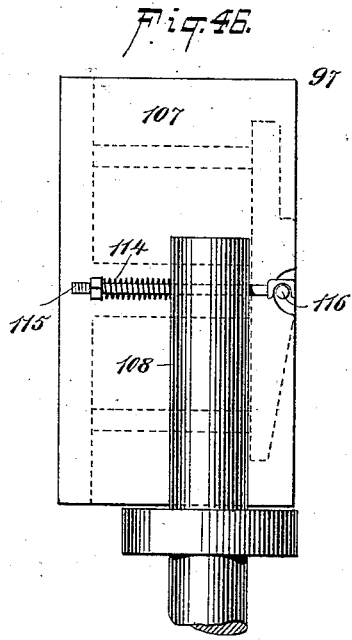
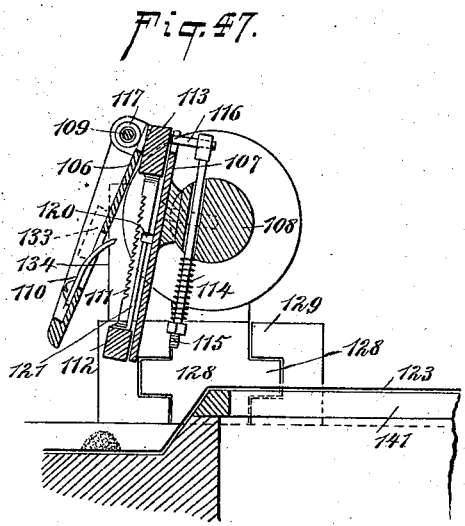
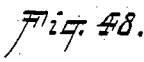
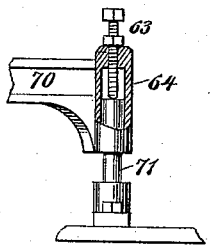
WITNESSES:  INVENTOR (No Model.) 20 Sheets—Sheet 20.

J. R. WILLIAMS.
CIGARETTE MACHINE.

No. 548,687. Patented Oct. 29, 1895.

WITNESSES:
William Gaebel.
Edward D. Miller.

INVENTOR
J. R. Williams,
BY Chas. C. Gill
ATTORNEY.

UNITED STATES PATENT OFFICE.

JOHN R. WILLIAMS, OF EAST ORANGE, NEW JERSEY, ASSIGNOR TO THE JOHN R. WILLIAMS COMPANY, OF NEW YORK, N. Y.

CIGARETTE-MACHINE.

SPECIFICATION forming part of Letters Patent No. 548,687, dated October 29, 1895.

Application filed November 19, 1894. Serial No. 529,282. (No model.) Patented in Hungary April 2, 1895, No. 2,777; in Spain April 6, 1895, No. 17,003; in Belgium April 16, 1895, No. 114,826; in Italy May 2, 1895, No. 425; in England May 4, 1895, No. 1,789; in Austria June 14, 1895, No. 2,147, and in France July 12, 1895, No. 246,266.

*To all whom it may concern:*

Be it known that I, JOHN R. WILLIAMS, a citizen of the United States, residing at East Orange, in the county of Essex and State of New Jersey, have invented certain new and useful Improvements in Machines for Making Cigarettes, (for which I have obtained the following foreign patents, viz: British patent, No. 1,789, dated May 4, 1895; French patent, No. 246,266, dated July 12, 1895, filed March 30, 1895; Austrian patent, No. 2,147, dated June 14, 1895, filed March 27, 1895; Hungarian patent, No. 2,777, dated April 2, 1895, filed March 14, 1895; Italian patent, No. 425, dated May 2, 1895, filed March 31, 1895; Belgian patent, No. 114,826, dated April 16, 1895, filed March 30, 1895, and Spanish patent, No. 17,003, dated April 6, 1895,) of which the following is a full, clear, and exact description.

The invention relates to improvements in machines for making cigarettes; and it consists in the novel features and combinations of parts, with certain details of construction hereinafter fully described, and particularly pointed out in the claims.

The machine embodying the invention made the subject of this application embraces automatic mechanism for feeding the filler-tobacco in bulk, severing predetermined charges of the same, and delivering said charges to a traveling shuttle, which conveys the same to the rolling-apron; also, mechanism for cutting the wrappers for the cigarettes, applying paste to the edges thereof, and conveying the same from the cutting mechanism to the rolling-table, the wrappers being held by air-suction in an even flat condition while being cut and pasted and while being carried from the cutting mechanism to the rolling-apron, which also is in connection with air-suction apparatus, whereby the wrapper is received in its distended flat condition and so held while being rolled upon the filler-tobacco for forming the cigarettes, and also novel mechanism for rolling the cigarettes and trimming the ends thereof while in the loop of the rolling-apron.

The construction and operation of the various parts of the machine will be specifically described in their order hereinafter, from which description and the accompanying drawings the invention will be more fully understood.

The machine which is the subject hereof is illustrated in the operation of rolling all-tobacco cigarettes; but I do not confine the invention in every instance to the use of a tobacco wrapper or binder nor to the manufacture of cigarettes of any special length or diameter. Nor is the invention confined to rolling what are technically known in law and commerce as "cigarettes," since the filler and wrapper or binder may be of larger proportions than those required for the usual cigarette, and under such conditions the product will be ordinarily termed "cigars" or bear other trade designations.

In the drawings are shown various cams and connecting-arms for imparting movement from the main driving-shaft to the mechanism constituting the essential parts of the machine; but the invention is not confined to these special cams and arms and they may be varied within the skill of the intelligent mechanic.

Figure 19:
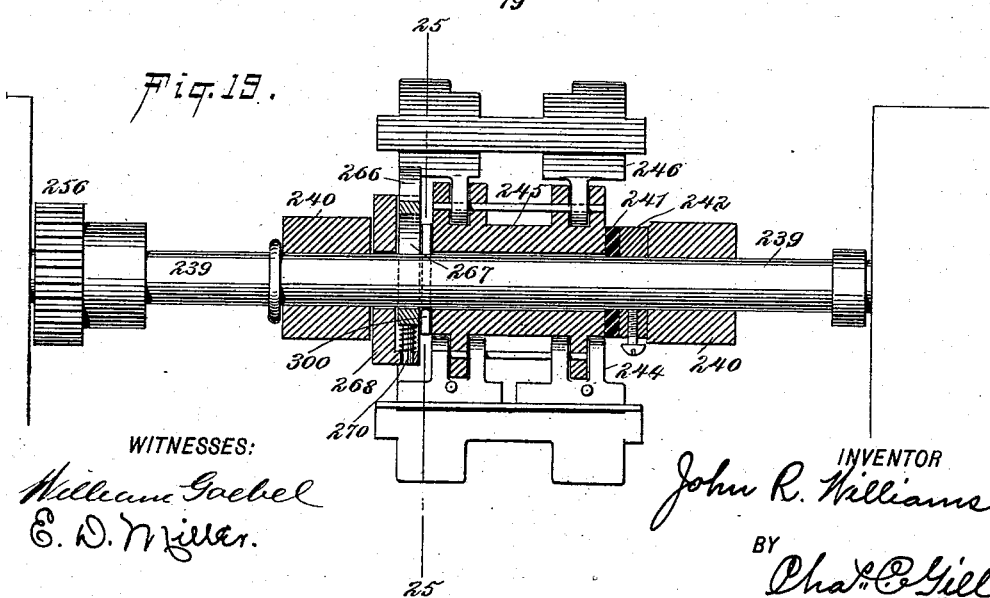
Figure 49:
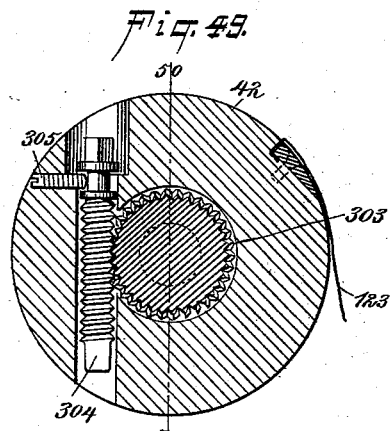
Figure 50:
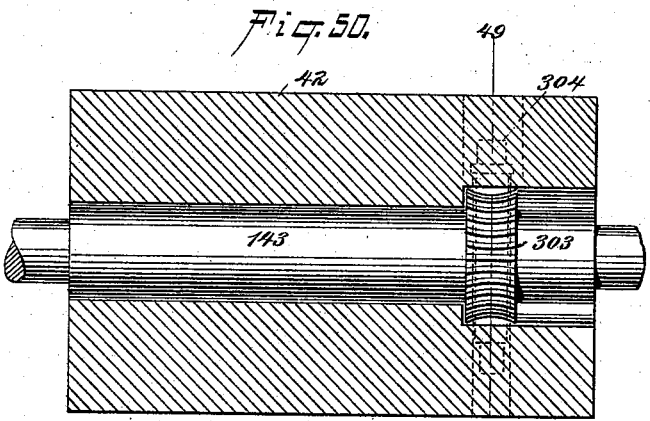
Figure 51:
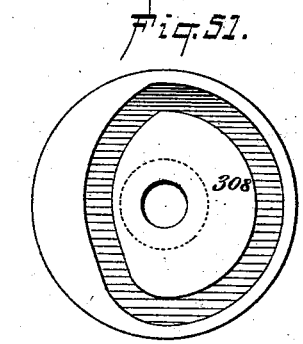
Figure 52:
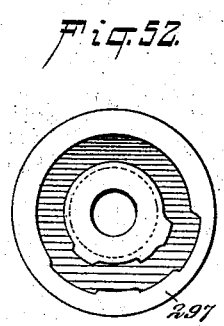
Figure 53:
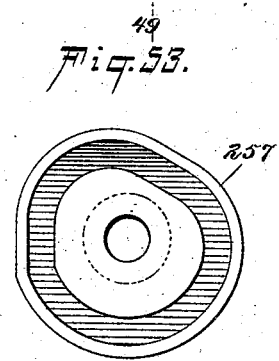
Figure 54:
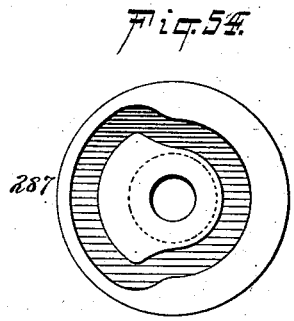
Figure 55:
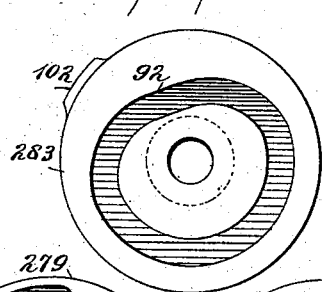
Figure 56:
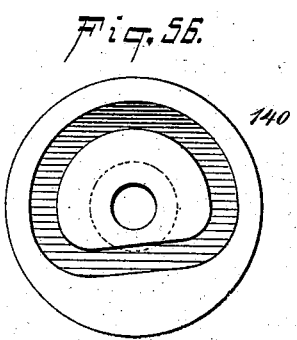
Figure 57:
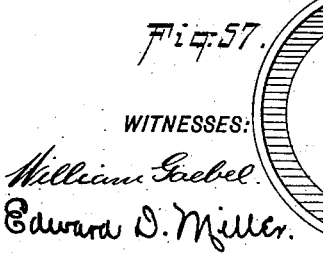
Figure 58:
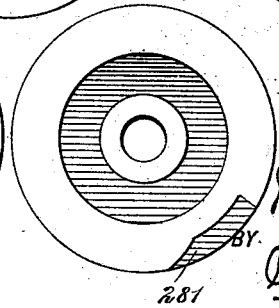

Referring to the accompanying drawings, Figure 1 is a top view of a machine constructed in accordance with and embodying the invention, the pneumatic wrapper-carrier being shown in position over the perforated portion of the rolling-apron and the reciprocating roller of the latter being shown in its rear position. Fig. 2 is a side elevation of same, looking at the left-hand side of the machine. Fig. 3 is a side elevation of same looking at the right-hand side of the machine. Fig. 4 is a front view of the machine. Fig. 4ª is a longitudinal section of a detailed portion of the machine, showing the rock-shaft within the sleeve and hereinafter referred to. Fig. 5 is a vertical longitudinal section of the machine on the line 5 5 of Fig. 1, and illustrating the pneumatic wrapper-carrier and the reciprocating roller for the apron, with their accessory parts, in their rear position. Fig. 6 is a like section of same, but illustrating the pneumatic wrapper-carrier and reciprocating roller for the apron in their advancing position, the apron being shown in the operation of rolling a cigarette. Fig. 7 is also a like section of same, but illustrating the pneumatic wrapper-carrier and the reciprocating roller in their front position, the former being directly over the wrapper-cutting die and the rolling-apron being shown in the position it assumes when discharging the rolled cigarette to the buckets which carry it to the stationary knives, where, with the co-operation of the complemental oscillating knives, its ends are trimmed. Fig. 8 is a vertical longitudinal section through the said machine on the dotted line 8 8 of Fig. 1. Fig. 9 is a vertical transverse section through the machine on the dotted line 9 9 of Fig. 1, and illustrating the shuttle which conveys the charges of tobacco from the feed mechanism to the rolling-apron in its initial position in line with the feed-belt and prior to moving across the machine to deposit the charge upon the rolling-apron. Fig. 10 is a like section of same, but illustrating the shuttle in the position it will assume while dropping the charge of tobacco for a cigarette directly upon the rolling-apron. Fig. 11 is a detached top view, partly in section, of the front portion of the machine, and illustrating the pneumatic wrapper-carrier in its rear position over the rolling-apron and the shuttle also in position over the rolling-apron preparatory to being turned downward to deposit its charge of filler-tobacco thereon. Fig. 12 is a like view of same, but illustrating the pneumatic wrapper-carrier in its forward position and in proper alignment with the wrapper-cutting die to receive the wrapper therefrom, the wrapper being illustrated on the die in Fig. 11. Fig. 13 is a vertical section, on an enlarged scale, through the paste-receptacle, the tube to which the pneumatic wrapper-carrier nozzle is connected, and the air-chamber below said tube and communicating therewith, the paste-belt being partly broken away. Fig. 14 is a vertical section of a part of same on the dotted line 14 14 of Fig. 13, the pasting-belt being shown in position depressed upon the edge of the wrapper located upon the cutting-die. Fig. 15 is a vertical section of a part of the machine on the dotted line 15 15 of Fig. 13, and illustrating the mechanism by which the pasting-belt may be depressed upon the wrapper and the pneumatic carrier, upon the removal of the belt, caused to descend upon the wrapper for the purpose of lifting and conveying it to the rolling-apron. Fig. 16 is a side elevation of a portion of the pneumatic wrapper-carrier. Fig. 17 is a bottom view of the nozzle at the end of the pneumatic wrapper-carrier, and illustrating particularly the perforated face thereof. Fig. 18 is an enlarged top view of the mechanism which receives the cigarettes from the rolling-apron and effects the trimming of the ends thereof. Fig. 19 is a vertical transverse section of same on the dotted line 19 19 of Fig. 18. Fig. 20 is a vertical longitudinal section of same on the dotted line 20 20 of Fig. 18, and illustrating a cigarette as having been moved from the rolling-apron into one of the buckets preparatory to being carried rearward and downward to the stationary knives for the purpose of having its ends trimmed. Fig. 21 is a like view of same, but illustrating the position of the parts when the cigarette has reached the stationary knives and is about to be trimmed by the descending oscillating knives, which co-operate with said stationary knives, this figure also illustrating the buckets as being locked against further revolution during the continued motion of the oscillating knives to a point slightly below the horizontal plane of the cigarette. Fig. 22 is a detached vertical section through the buckets and their shaft on the line of the element hereinafter designated as the "stop" or "pin" 300, (shown enlarged in Fig. 19,) said buckets being illustrated in their normal condition. Fig. 23 is a section similar to Figs. 20 and 21, but illustrating the position of the parts after the oscillating knives have reached the extent of their movement and trimmed the ends of the cigarette held in proper relation to the stationary knives. Fig. 24 is a like section of same, but illustrating the position of the parts after the oscillating knives have returned to their upward position preparatory to the uppermost bucket receiving the next cigarette to be rolled, and the arm which in Fig. 23 locks the buckets against further rearward revolution upon their shaft being shown elevated from said buckets. Fig. 25 is a detached sectional view through a portion of the buckets and their operating mechanism on the dotted line 25 25 of Fig. 19, the buckets being shown in their open position. Fig. 26 is a like view of same, but showing one of the buckets which contains the cigarette in its closed position holding the cigarette firmly, so as to insure its being properly trimmed by the knives. Fig. 27 is a vertical section through the device by which the buckets are closed, as illustrated in Fig. 26, and which will be hereinafter referred to. Fig. 28 is an enlarged central vertical longitudinal section through the feeding-belt and rollers by which the filler-tobacco is fed to the reciprocating shuttle, by which the charges are received and conveyed to the rolling-apron, the shuttle being shown in its initial condition in line with the upper surface of said belt and the reciprocating knife, which severs the charges of tobacco, being in its upper position, permitting the feeding of the filler-tobacco into said shuttle and against the plunger therein, which recedes into the shuttle under the pressure of the filler-tobacco against the same. Fig. 29 is a detached side elevation of the pawl-and-ratchet mechanism by which the feed-belt and its rollers (illustrated in Fig. 28) are given an intermittent motion for the purpose of feeding the tobacco to the shuttle. Fig. 30 is a section corresponding exactly with the section of Fig. 28, but illustrating the plunger within the shuttle as having been pressed inward by the filler-tobacco, the knife for severing the charges of tobacco as having been depressed to cut off that portion of the tobacco within the shuttle from the remaining portion thereof, and the feed mechanism as having been tripped to prevent any further feeding of the tobacco until the shuttle has delivered the charge within it to the rolling-apron and returned to the position in which it is illustrated in Fig. 28. Fig. 31 is a side elevation of the pawl-and-ratchet mechanism by which the feed-belt and rollers are given their intermittent motion, the pawl being shown as elevated from the ratchet by a segmental plate, which is utilized to prevent the engagement of the pawl and ratchet except when the shuttle is in position and condition to receive the filler-tobacco from the feeding devices. Fig. 32 is a vertical longitudinal section on the dotted line 32 32 of Fig. 1, and illustrating the rolling-apron, its roller, and accessory parts in their rear position and a charge of tobacco for a cigarette in position upon the rolling-apron in the rear of the wrapper, which is arranged on said rolling-apron over the perforated portion thereof and the slotted portion of the table which supports said apron. Fig. 33 is a like section of same, but illustrating the reciprocating roller in its advanced position and the loop of the apron drawn down to size and roll the cigarette. Fig. 34 is a like view of same, showing the reciprocating roller in its extreme forward position discharging the rolled cigarette. Fig. 35 is a detached sectional view of a portion of the air-pipes, and illustrating more particularly the valve by which the air may be cut off from the pneumatic wrapper-carrier and turned upon the perforated rolling-apron or cut off from the perforated rolling-apron and turned upon the pneumatic wrapper-carrier, there being no air upon the rolling-apron when the carrier is affected by the air and no air upon the carrier when the apron is to retain the wrapper. Fig. 36 is a detached sectional view through a portion of the die-supporting table, and illustrating the valve by which the air may be either admitted to or cut off from the cutting-die secured upon said table. Fig. 37 is a detached sectional view through the lower portion of the tube to which is connected the pneumatic wrapper-carrying nozzle, and illustrating more particularly the gearing connected therewith for operating the pasting-belt. Fig. 38 is a like view of same, showing the direction in which the gearing will move when the pneumatic wrapper-carrier is turned to its forward position over the cutting-die. Fig. 39 is a detached vertical section of same on the dotted line 39 39 of Fig. 37. Fig. 40 is a detached side elevation, partly in section, of the actuating mechanism for moving the reciprocating carriage which carries the reciprocating roller connected with the rolling-apron. Fig. 41 is a detached side elevation of a portion of the operative mechanism of the machine, looking at the left-hand side thereof, and which will be understood from the reference-numerals thereon and hereinafter referred to. Fig. 42 is a detached longitudinal section through a portion of the machine at the left-hand end of the shaft of the reciprocating roller for the apron, and illustrating the end of said shaft and the cam and gear-wheel thereon, the cam preventing the rotation of the shaft and roller during the first portion of the forward movement of the latter and then leaving its contacting surfaces and permitting the gear-wheel to engage the rack shown, so as to rotate the shaft and its roller and cause the latter to wind the apron upon itself during the latter portion of its forward motion. Fig. 43 is a vertical section of same on the dotted line 43 43 of Fig. 42, and illustrating by the dotted line 42 42 the section on which Fig. 42 is taken. Fig. 44 is an enlarged top view of the shuttle which receives the separate charges of filler-tobacco and conveys them to the rolling-apron, the interior parts of the shuttle being shown in their normal initial condition and partly in section and the hinged side of the shuttle having been wholly removed. Fig. 45 is a like view of same, but illustrating the plunger of the shuttle at its inward position. Fig. 46 is a bottom plan view of the said shuttle. Fig. 47 is a central vertical section of said shuttle, illustrated with its hinged side open and its plunger as having been forced outward to deposit the charge of filler-tobacco upon the rear portion of the rolling-apron. Fig. 48 is a detached elevation, partly in section, of the inner end of the roller-arm, which co-operates with the wrapper-cutting die, and illustrating more particularly the means for adjusting said arm vertically. Fig. 49 is a vertical transverse section through the reciprocating roller of the rolling-apron. Fig. 50 is a vertical longitudinal section of same on the dotted line 50 50 of Fig. 49, and illustrating by the dotted line 49 49 the section on which Fig. 49 is taken; and Figs. 51 to 58, inclusive, are detached side elevations of the cams located upon the driving-shaft of the machine and employed to secure the correct movement of the various operative parts thereof, the said cams being specifically referred to hereinafter by reference-numerals, and Figs. 57 and 58 showing the obverse and reverse faces of the same wheel.

In the drawings, Fig. 1, 65 designates the supporting bed or table of the machine, and 66 an auxiliary table supporting the die 67, by which, in conjunction with the rollers 68, the wrappers for the cigarettes are cut. The die 67 is in the outline of the binder or wrapper and contains a perforated yielding platen 69, Fig. 14, upon which the leaf is placed and then subjected to the action of the rollers 68, which in passing over the leaf placed upon the die 67 will cut the wrapper therefrom. The rollers 68 are secured to the arm 70, the latter being mounted upon the stud 71 (see Fig. 48) and adapted to have an oscillating movement thereon when swung by hand over the die 67 and back to the position at the left of the table 66, as shown in Fig. 1. The die 67 is hollow and is mounted over the chamber 72 below the table 66, (see Fig. 36,) the said chamber being connected by means of the air-pipe 73 with the main air-pipe 74, which passes to a vacuum-chamber 75, (see Fig. 4,) the purpose of the pipes 73 and 74 being at the proper time to create a suction through the perforated platen 69 for holding the leaf smoothly upon the die 67 preparatory to the wrapper being cut. At the upper end of the air-tube 73 is provided the valve 76, by which the suction may be cut off from the die 67 when it is desired to release the cut wrapper from the platen 69. The valve 76 is mounted upon the rock-shaft 77 and receives its motion through intermediate mechanism from the driving-shaft 78 in the manner hereinafter described, the entire function of the said valve 76 being to permit the suction action on the die when it is desired to hold the leaf or the cut wrapper thereon and to release said action at the moment the pneumatic wrapper-carrier has lowered upon the die to lift the wrapper therefrom.

The stud 71, upon which the arm 70 is mounted, is a plain cylindrical rod of metal snugly fitting within the sleeve 64, formed on said arm 70, as illustrated more clearly in Fig. 48. The upper end of the sleeve 64 is provided with the adjusting-screw 63, whose lower end is in contact with the upper end of the stud 71. The purpose of mounting the arm 70 upon the stud 71, as described above and as illustrated in Fig. 48, is to enable the convenient vertical adjustment of the said arm 70 and the rollers 68, and it will be observed upon reference to Fig. 48 that upon working the screw 63 downward against the upper end of the stud 71 the arm 70 and the rollers 68 will be elevated and that upon working the screw 63 upward the arm 70 will lower upon the stud 71 and bring the rollers 68 in closer relation to the edges of the cutting-die 67.

The mechanism by which the valve 76 and rock-shaft 77 are actuated is shown more clearly in Figs. 1, 3, and 4, in which it will be seen that on the right-hand end of the rock-shaft 77 is secured an arm 275, which, by means of a rod 276, is connected with the pivoted arm 277, having a pin 278, in contact with the periphery of the cam-wheel 279 on the shaft 78. A spring 280, Fig. 3, retains the pin 278 against the cam-wheel 279, which on its periphery is provided with the notch 281, into which the pin 278 will pass when it is desired that the valve 76 shall close to cut off the suction from the die 67. The air-suction is on the die 67 at all times except when the pin 278 is in the notch 281, and this takes place only when the pneumatic wrapper-carrier is ready to lift the cut wrapper from said die and convey it to the rolling-apron. It will be understood, therefore, that the valve 76 is open the greater part of the time, it only closing to permit the release of the cut wrapper from the perforated platen 69.

The mechanism by which the filler-tobacco is fed in bulk and definite charges thereof severed is more clearly illustrated in Figs. 1, 8, 28, 29, 30, and 31, in which figures it will be observed that over the table 65 is suitably mounted upon rollers 79 and 80 the endless feed-belt 81, which is inclosed at opposite edges by the guides 82 and is adapted to travel toward the front of the machine and carry the tobacco below the gage-plate 83, of usual construction, and below the pressure-roller 84, which is directly over the roller 80 and has upon its shaft the gear-wheel 85, which engages a similar gear-wheel 86, located upon the shaft of the roller 80. The gear-wheel 86 is engaged by a corresponding gear-wheel 87, mounted upon the shaft 88, (in rear of the rollers 80 and 84,) and receives an intermittent motion therefrom. The shaft 88 has loose upon it the segment 89, which is engaged by the segment 90, the latter being retained upon the auxiliary shaft 91, Fig. 8, and carrying an arm in engagement with the cam 92, which is mounted upon the main driving-shaft 78. During the revolution of the main driving-shaft 78 the cam 92 imparts to the segment 90 an oscillating movement upon its shaft 91, and during this movement the teeth of the segment 90, engaging the teeth of the segment 89, cause the said segment 89 to have an oscillating movement upon the shaft 88 and to move the pawl 93, carried by said segment 89, either rearward against or forward over the teeth of the ratchet 94, which is rigidly secured upon the shaft 88. When it is desired that the tobacco upon the apron 81 shall feed inward between the rollers 80 and 84, the cam 92, through the segments 90 and 89, causes the pawl 93 to move rearward against the teeth of the ratchet 94, and hence causes said ratchet, with its shaft 88, to revolve a definite distance, the motion of the shaft 88 being communicated, through the gear-wheel 87, to the gear-wheel 86 and from the gear-wheel 86 to the gear-wheel 85, whereby the shafts of the rollers 80 and 84 are set in motion and the belt 81 is caused to travel toward the front of the machine and carry the tobacco inward to the rollers 80 and 84, by which it is forced through the throat 95 (see Fig. 28) and into the shuttle, hereinafter described.

The pawl 93 has a spring action toward the teeth of the ratchet 94 by reason of the spring 282, and during its motion toward the rear of the machine it will always engage said ratchet and rotate the shaft 88, unless at such time it is prevented from so doing by reason of the cam-plate 96, which straddles the shaft 88 and is adapted, when elevated, as shown in Figs. 30 and 31, to lift the point of the pawl 93 above the teeth of the ratchet 94.

It is desired that the inward movement of the tobacco between the rollers 80 and 84 shall be capable of regulation, and hence the plate 96 has been provided, which plate when in its upper position does not interfere with the motion of the segments 89 and 90, but simply prevents the pawl 93 from effecting the rotation of the ratchet 94 and shaft 88. When a sufficient quantity of the tobacco has been fed through the throat 95 and into the shuttle 97 for a cigarette, the plate 96 is automatically elevated for the purpose of preventing any further feeding of the tobacco by reason of the motion of the pawl 93, and to effect such result the plate 96 is secured to the inner face of the pivoted lever-arm 98, which carries at its front end the rod 99 and is provided with the upwardly-acting spring 100, the tension of which is to effect the ascent of the said arm 98 and plate 96 upon the release of the rod 99 from the pivoted catch 101. In Fig. 28 the front end of the rod 99 is shown held down by the catch 101 and the shuttle 97 in position to receive the filler-tobacco. When a sufficient quantity of the tobacco has entered the shuttle 97, the catch 101 will be relieved from the rod 99 and the latter, as shown in Figs. 30 and 31, will be elevated to secure a stoppage of the feeding mechanism, which stoppage is effected, as above described, by the elevation of the plate 96 to lift the pawl 93 above the ratchet 94. The lower portion of the arm 98 carries a roller, Fig. 3, to engage with the cam 283, Fig. 55, which controls the extent of movement upward the upper end of the said arm 98 shall have, and which cam 283 is provided with a projection 102, which acts to raise the lower end of said arm 98, and thus depress the upper end of said arm with the plate 96 and rod 99, the front end of the latter when thus depressed or reset being engaged by the catch 101, as shown in Fig. 28.

The knife by which separate charges of filler-tobacco are severed is designated by the numeral 103 and is shown more clearly in Fig. 9 and 10. Said knife 103 is pivoted at one end and at its other end is slotted and retained by a screw upon the upper end of the vertically-reciprocating rod 104, secured to the cross-bar 285, also carrying the guide-rod 286, Fig. 1, and which cross-bar and rods 104 and 286 receive their vertical movement from a cam 287 on the driving-shaft 78, Figs. 5, 7, and 54, through the medium of the intermediate pivoted lever-arm 105, whose oscillation causes the said cross-bar and rods 104 and 286 to have a vertical movement, whereby the knife is caused to have its regular oscillatory motion, every downward movement of the knife 103 effecting the severance of that portion of the filler-tobacco which may be in the shuttle 97 from the remaining portion thereof in the throat 95. The knife 103 is guided in its movement and stiffened by the flattened side of the rod 286, which moves with the cross-bar 285 and is in close relation to the knife 103, as shown in Fig. 1. By reason of the rod 286 moving with the knife or cutter 103 the minimum amount of friction is generated between said rod and knife and the rod need never project above the knife.

The severed charges of filler-tobacco received by the shuttle 97 are carried thereby to the apron 123, on which the cigarette is rolled. The shuttle 97 is more clearly illustrated in Figs. 28, 30, 44, 45, 46, and 47, and consists of the plates 106 and 107, the latter being securely attached to the shaft 108, and the former being secured to the plate 107 by a hinge 109 and carrying the spring 110, which projects through a slot cut in said plate 106 to engage the ratchet 111, formed upon the arm which connects the plunger 112 with the auxiliary arm 113, as shown more clearly in Figs. 45 and 47. The plunger 112 extends the entire length of the shuttle 97 and is adapted to have a reciprocating motion therein, its inward motion being effected by the pressure of the filler-tobacco passing through the throat 95 and its outward motion by means of the spring 114, which, as shown in Figs. 46 and 47, is placed upon a rod 115, passing through the shaft 108, and at one end connected with a pin 116, extending from the auxiliary arm 113, which is rigid with the plunger. The inward motion of the plunger 112 is imparted to the rod 115 and compresses the spring 114, and upon the plunger 112 being released after such inward motion the tension of the spring 114 restores the plunger 112 to its outward position. (Shown in Figs. 28 and 47.) While the shuttle 97 is in a horizontal position the cover or plate 106 is retained in closed position, as illustrated in Fig. 28, by means of a coiled spring 117 at the hinge 109, and the free end of the spring 110 is thereby kept in contact with the ratchet 111. The plunger 112 is guided in its reciprocating movement between the plates 106 and 107 of the shuttle 97 by means of the guide-rods 118, passing through the guides 119, secured to the plate 107 of the shuttle, as shown more clearly in Fig. 45. Within the shuttle and secured by means of studs 120 to the plate 107 are the needles 121, which pass through apertures in the plunger 112 and terminate in line with each other on a plane parallel with the outer edges of the shuttle. The needles 121 are stationary and filler-tobacco is forced upon them during the feeding operation, the plunger gradually receding inward as the accumulation of the tobacco beyond the vertical plane of the knife 103 increases.

When the filler-tobacco is fed inward against the plunger 112, as illustrated in Figs. 28 and 30, the shuttle at such time being in a horizontal position, said plunger will be forced inward by the tobacco until a sufficient quantity of the latter has entered the shuttle to move the plunger inward and its arm 113 outward far enough for the latter to come into contact with the stop 122 and effect the cessation of the feeding. During the inward movement of the plunger 112 the spring 114 is, as above described, compressed, and the pawl-spring 110 engages the ratchet-teeth 111, so as to prevent the force of the spring 114 from acting on the tobacco within the shuttle. As the plunger 112 gradually moves inward, the spring 110, engaging the teeth 111, will hold the plunger at every stage of its inward movement, and when the shuttle is moved from its horizontal position in line with the throat 95 the said spring 110 will prevent the spring 114 (acting through the rod 115) from causing the plunger 112 to eject the charge of tobacco prior to the shuttle reaching the rolling-apron 123. After the shuttle shall have reached the rolling-apron 123, preparatory to depositing the charge of filler-tobacco thereon, the said shuttle will be turned to the position illustrated in Fig. 47 and its plate or cover 106 opened so as to release the spring 110 from the ratchet 111 and allow the spring 114 to force the plunger outward for the purpose of ejecting the charge of filler-tobacco. The inward motion of the plunger 112 by the pressure of the tobacco against the same, as shown in Fig. 30, has the effect of causing the arm 113 to press against the stop 122 and force the rock-shaft 124 to turn slightly toward the front of the machine, this having the effect of carrying the catch 101 from the arm 99 and freeing the latter for the purpose of securing the elevation of the plate 96 and the prevention of any further feeding of the filler-tobacco, as above described, until the shuttle 97 has been emptied and is again in the position in which it is shown in Fig. 28 in line with the throat 95, with the knife 103 in its upward position. Upon the rock-shaft 124 is provided the spring 125, as shown in Fig. 1, which returns the shaft 124, stop 122, and catch 101 to their normal position (illustrated in Fig. 28) after the same have been moved frontward by the action of the arm 113 against the stop 122. The stop 122 consists of a threaded set-screw passing through the internally-threaded sleeve 126, and said screw may be adjusted at any position desired with respect to the extent of movement it is desired the plunger 112 and arm 113 shall have prior to the feeding of the tobacco being stopped. The adjustment of the screw or stop 122 will regulate the quantity of tobacco which shall enter the shuttle 97 prior to the stoppage of the feed mechanism by the releasing of the rod 99. If the stop 122 is adjusted outward or toward the front, the filler-tobacco will necessarily have to cause the plunger 112 to have a more extended movement prior to the arm 113 striking said stop and checking the feed, and hence under such condition a larger quantity of filler-tobacco would constitute the charge, and when the stop 122 is adjusted inward or toward the rollers 80 and 84 the arm 113 will more quickly reach the said stop, and hence a smaller quantity of tobacco will effect the full movement of the plunger 112. Hence it will be observed that to reduce the quantity of tobacco in the separate charges of filler-tobacco the screw 122 will be adjusted toward the rollers 80 and 84, and that to enlarge the charge of filler-tobacco for a cigarette it will simply be necessary to adjust the screw 122 outward or toward the front. The rock-shaft 124 is mounted in suitable bearings, as shown clearly in Figs. 1 and 30.

The shuttle 97 is carried on the left-hand end of the shaft 108, and said shaft is mounted in the bearings 127, formed at opposite ends of the carriage 128, which is mounted and has a transverse sliding movement in the guide 129. The travel of the shuttle is from the position in which it is illustrated in Figs. 1, 28, and 30 to a position directly over the rolling-apron 123, as shown in Fig. 47, the said shuttle upon arriving at the position shown in Fig. 47 above the rolling-apron 123 turning downward with its shaft 108 to discharge the filler-tobacco upon said apron. The shaft 108 is provided with the cam-groove 130, at the right-hand end of which the said groove takes an abrupt spiral turn, as illustrated in Fig. 1. During the sliding movement of the carriage 128, carrying the shaft 108 and shuttle 97, the said shaft passes through the stationary sleeve 131, which is provided with the screw 132, whose point forms a stud extending into the groove 130 of the said shaft 108. When the carriage 128, shaft 108, and shuttle 97 are moved to the left from the position illustrated in Fig. 1 and the point of the screw 132 is reached by the abrupt spiral turn at the right-hand end of the groove 130, the said shaft 108 will be compelled to turn in order that the said groove may follow along the screw 132, and thus said shaft will be given a sufficient movement to turn the shuttle 97 downward to the position illustrated in Fig. 47. Upon the return of the carriage 128, shaft 108, and shuttle 97 to the right, the first portion of the movement of the said carriage will cause the groove 103 to pass along the point of the screw 132, and owing to the spiral form of the said groove at its right-hand end the said screw 132 will restore the shaft 108 and shuttle 97 to their former horizontal position. When the shuttle 97 is being turned downward to the position shown in Fig. 47, an arm 133 thereon will strike the standard 134, formed on the carriage, and said standard being rigid will overcome the spring 117 and open the plate or cover 106, as shown, and thereby cause the spring 110 to leave the ratchet 111. When the shuttle 97 is turned upward again to its horizontal position, the arm 133 will leave the standard 134, and at such time the spring 117 will close the plate or cover 106 and re-establish the engagement of the spring 110 with the ratchet 111.

The carriage 128 is given its reciprocating motion back and forth across the machine in order to effect the movement of the shuttle 97 from its position in line with the feed-belt 81 to that over the rolling-apron 123 and then back to its former position in line with said feed-belt by means of the segment 136 and the rack 137, engaged by the same and formed upon the lower surface of said carriage, as illustrated more clearly in Fig. 9, in which it will be observed that the carriage is at the right-hand side of the machine with the shuttle 97 in line with the feed-belt, while in Fig. 10 the segment 136 is shown as having made a partial revolution and as having moved the carriage 128 to the left sufficiently to cause the shuttle 97 to assume its position directly over the rolling-apron 123. The segmental rack 136 is mounted upon a rock-shaft and is formed with the segmental rack 138, which is in engagement with the oscillatory rack 139, (see Figs. 7, 9, and 10,) mounted upon the auxiliary driving-shaft and actuated by the cam 140, Fig. 56, located upon the main driving-shaft. The motion of the cam 140 imparts an oscillating movement to the rack 139, and this in turn imparts to the racks 138 and 136 a like movement, thereby causing the rack 136 to effect the transverse reciprocation of the carriage 128 from the main driving-shaft.

The rolling-apron 123 is of flexible material and at its front end is secured to the table 141, Fig. 5, while at its rear end the said apron is secured to the roller 142, secured upon the shaft 143, Fig. 1, which is mounted in bearings 144, formed upon the carriage 145, which is adapted to have a longitudinal traveling movement upon the rods 146 under the action of the gear-wheel 147 and rack 148, the latter being an integral part of said carriage 145. As will be seen in Figs. 1 and 5, the carriage 145 has at its front end the shaft 143 of the roller 142 and also the sleeves 149, which fit upon said rods 146, while at its rear end said carriage is provided with the sleeves 150, also fitting upon said rods 146. The rack 148 extends centrally lengthwise of said carriage 145, and is directly below and in engagement with the gear-wheel 147, as illustrated in Figs. 1 and 2. The longitudinal reciprocating movement of the carriage 145 has the effect of moving the roller 142 toward the front end of the machine during the rolling of the cigarette and then drawing it back to its normal position (illustrated in Figs. 1 and 5) preparatory to the apron 123 receiving another charge of tobacco for the subsequent cigarette to be rolled. The left-hand end of the shaft 143, carrying the roller 142, is provided with the gear-wheel 151 and the cam-wheel 152, (shown by full lines in Figs. 42 and 43 and by dotted lines in Fig. 1) the purpose of the cam 152 being to engage and move against the flat surface 154, formed on the stationary frame 155, and thereby during the first portion of the movement of the roller 142 toward the front of the machine preventing the shaft 143 and said roller 142 from revolving, while during the latter portion of the forward movement of the roller 142 the cam 152 passes beyond the flat surface 154 of said stationary frame 155, and at such time the gear-wheel 151 will engage the rack 156, also formed on the side of said stationary frame 155, and effect the revolution of the shaft 143 and roller 142, thus causing the latter to wind up the apron during the latter portion of its forward movement in the operation of rolling a cigarette. During the return movement of the roller 142 with the carriage 145 toward the rear the engagement of the gear-wheel 151 with the rack 156 will have the effect of causing the roller 142 to unwind from itself the rolling-apron 123 until the shaft 143 has moved rearward sufficiently for the cam 152 to meet the flat surface 154 of said stationary frame 155, at which time the gear-wheel 151 will pass from the teeth of the rack 156, and the cam 152, in connection with the flat surface 154, will prevent the revolution of the roller 142 during the further or latter part of the rearward movement of the said shaft 143 and carriage 145. Thus it will be seen that the roller 142 is mounted upon a shaft 143, which during the first part of its forward movement does not revolve, while during the latter part of its forward movement it does revolve and causes the roller to wind the apron 123 upon itself, and that the said shaft upon its rearward movement first causes the roller 142 to unwind the apron 123 from itself and then without revolving continues its rearward movement to its initial position, which is that illustrated in Figs. 1 and 5.

The rolling-table 141, upon which the apron 123 is placed, is slotted, as shown in Figs. 9 and 10, below that portion of the apron 123 which is perforated, as illustrated in Fig. 1, and below said slotted portion of the table 141 is formed the air box or chamber 157, which by means of a tube 158, box 159, and tube 160 is connected with the main tube 74, leading to the suction apparatus or vacuum-chamber 75, above referred to, the purpose of the connection of the chamber 157 with the vacuum apparatus 75 being at the proper time to permit of the holding of the wrapper upon the apron 123 by means of air-suction, whereby the said wrapper may be held smooth and flat while being rolled with the filler-tobacco to form the cigarette. The box 159, which is intermediate the rolling-table 141 and the main suction-pipe 74, contains a swinging valve 161, (see Figs. 5 and 35,) and from said box 159 an additional air pipe or tube 162 passes to the pneumatic wrapper-carrier designated by the general number 163. The arrangement of the valve 161 is such that upon being turned in one direction it will effectually cut off the air-suction from the tube 158 and table 141 and apply said suction through the tube 162 to the pneumatic wrapper-carrier 163, and that by being turned in the other direction, which would impart to it just the opposite position from that illustrated in Fig. 35, the air-suction will be cut off from the pipe 162 and pneumatic wrapper-carrier 163 and be applied to the tube 158 and table 141. It will thus be seen that when the air-suction is on the table 141 it is cut off from the pneumatic wrapper-carrier 163, and that when the suction is on the carrier 163 it will be cut off from the table 141, the purpose being to release the cut wrapper from the carrier 163 and instantly bind it upon the apron 123 by cutting off the air from said carrier and turning it upon the table 141 simultaneously by the said valve 161. The valve 161 will be operated from the inner face 164 of the cam 279, which will, through the toothed lever 165, Fig. 3, and the pinion 166, engaged thereby, cause the spindle of said valve 161 to have a rocking motion, whereby the said valve 161 will be moved either to close the tube 158, as shown in Fig. 35, or to its opposite position for the purpose of closing the tube 162.

The pneumatic wrapper-carrier 163, which has been referred to above for the purpose of more fully explaining the operation of the valve 161, will be described in detail in an appropriate place hereinafter.

The carriage 145 is provided with and carries the parallel rods 167, as shown in Figs. 1 and 5, and upon these rods 167 is placed the auxiliary sliding carriage 168, which carries at its front end the transverse blade 169 and is normally held at the front ends of said rods 167 in the position illustrated in Figs. 1 and 5 by the coiled spring 170, placed upon the longitudinal rod 171 between the collar 172 thereon and the standard 173', which is rigid with the carriage 168.

The blade 169, as shown in Figs. 5, 6, 7, 32, 33, and 34, is used for aiding in the rolling of the cigarette and in the drawing of the loop of the apron 123 down to its proper size, and the operation of said blade 169 as an independent feature is well known in the art to which the present invention pertains. The rod 171 is secured at its front end to the carriage 168, and at its rear end is provided with a chain 173 and light weight 174, entering the main weight 288 and adapted to lift the latter, (see Figs. 5, 6, and 7,) while on said rod 171, intermediate the collar 172 and chain 173, is provided the adjusting-nut 175, which in its location is between the grooved standards 176 and 177 of the frame 178, rigidly secured to the carriage 145, as indicated more clearly in Figs. 1 and 32.

During the forward motion of the carriage 145 and roller 142 in the operation of rolling a cigarette the chain 173 will remain slack or free to move without the weight 288 for a definite length of time, and hence the weight 288 will not at such time act upon the rod 171, and during this forward movement of the carriage 145 and until the lower end of the weight 174 has been caught by the upper end of the weight 288, Figs. 5 and 6, the spring 170 will maintain the carriage 168 and blade 169 at the front end of the rods 167, whereby said blade 169, during the forward movement of the roller 142, will be enabled to pass over the loop in the apron 123 and also over the charge of filler-tobacco deposited on said apron by the shuttle 97. The blade 169 will remain at the front end of the rods 167 until it has passed over the loop of the apron 123 and the charge of filler-tobacco, and thereafter, the slack having been removed from the chain 173 or its free movement stopped, it and the weight 288 will exert their force in holding back the rod 171, thereby permitting the continued forward movement of the roller 142 and carriage 145 while the blade 169 with its carriage is being held back by the force of the weight 288, the spring 170 being in the meantime compressed and the standard 176 caused to approach the adjusting stop or nut 175 on said rod 171. After the roller 142 and carriage 145 have traveled forward sufficiently for the apron 123 to have been drawn against the lower edge of said blade 169 to properly reduce the size of the loop therein, the standard 176, moving with the carriage 145 and coming into contact with the stop 175, will of itself take up the weight 288 and lift the latter, Figs. 7 and 34, while the force of said weight is still exerted to maintain the blade 169 in its definite position, said weight preventing the spring 170 from driving the carriage 168 forward on the rods 167 and holding the stop 175 against the said standard 176. The forward movement of the roller 142 and carriage 145 while the blade 169 is being held back by the weight 288 enables the said roller 142 to draw the loop in the apron 123 down to size against the rear edge of said blade 169, as illustrated in Fig. 33, and, the said loop having been drawn down to size, the standard 176 holding the stop 175 at one side and the weight 288 drawing the said stop 175 against the said standard, maintain the said blade 169 in a rigid position, whereby the size of the loop in the apron is not disturbed and the said blade then traveling forward with the roller 142 and carriage 145 is used as a means of effecting, in connection with the apron, the proper rolling of the cigarette until the latter is moved from over the front end of the table 141. The point at which the blade 169 will be stopped, so as to let the roller 142 advance ahead of it, will be determined by the slack or free movement in the chain 173, and the exact point at which the blade 169 will start to move forward again with the roller 142 after the loop in the apron 123 has been drawn down to size will be determined by the position of the stop 175 upon the rod 171, and hence the size of the loop in the apron 123, and consequently the size of the cigaratte rolled therein, may be regulated by adjusting the stop 175 upon the rod 171, and the more quickly the standard 176 comes into contact with the stop 175 the less will the loop in the apron 123 be drawn and the larger will be said loop and the cigarette rolled therein, and the more the stop 175 is adjusted forward, so as to increase the travel of the roller 142 and carriage 145 prior to the standard 176 meeting the said stop 175, the greater will the loop in the apron be drawn and the smaller will be the cigarette rolled. In Fig. 32 the blade 169 is shown in its initial condition, with the charge of filler-tobacco deposited upon the apron 123, while in Fig. 33 the condition of the parts is such that the slack has been taken out of the chain 173 and the weight 288 has so restrained the rod 171 that the carriage 145 has traveled sufficiently in advance of the carriage 168 for the loop in the apron to have been drawn down to size and the stop 175 to have been reached by the standard 176, which at such time will bear the weight 288, and the said weight 288 will hold the said stop 175 against said standard and thereby maintain the blade 169 in its set position with respect to the distance between it and the roller 142.

In Fig. 34 the roller 142 and carriage 145 are shown in their extreme forward position, and in this figure it will be observed that the standard 176 has carried the rod 171 and stop 175 forward and that the distance between the blade 169 and the roller 142 is the same as it was when the parts were in the position in which they are illustrated in Fig. 33, the loop in the apron 123 having thus been maintained of uniform size during the rolling operation and after having been reduced to its proper size. During the return movement of the roller 142 and carriage 145 to their initial position, which is that illustrated in Figs. 1 and 32, the said roller 142, carriage 145, carriage 168, and blade 169 travel rearward uniformly until the weight 288 has seated itself and the chain 173 become free or slack, at which time the roller 142 and carriage 145 will continue their rearward motion and the spring 170 will impel the carriage 168 forward on the rods 167 to their former position, so that upon the carriages 145 and 168 both reaching their rear position they will be in the relation to each other in which they are illustrated in Fig. 2, the stop 175 being intermediate the standards 176 and 177.

At the front end of the carriage 145 and on a lower plane than the roller 142 is provided a transverse metal plate 179, as more clearly shown in Figs. 32, 33, and 34, the purpose of which is, during the return movement of the roller 142 to its rear position, to insure the straightening out of the apron 123 over the table 141. The weight 288 snugly fits the cylinder 289, having an air-vent at its lower end, the purpose of the cylinder being to form a dash-pot to cushion the weight 288 on its descent. The light weight 174 is used mainly to prevent the chain 173 from bagging or buckling while free of the weight 288 or in what we term a "slack" condition—that is, not under the strain of the weight 288.

The pneumatic wrapper-carrier 163 is adapted to have an oscillating movement, by which its perforated nozzle 180 may be moved from the cutting-die 67 to carry the wrapper therefrom to the perforated portion of the rolling-apron 123, Fig. 1 showing the position of said nozzle over the said rolling-apron where it delivers the wrapper to said apron, while in Fig. 7 the nozzle is shown in position over the cutting-die 67. The nozzle 180 of the pneumatic wrapper-carrier 163 is adapted to have a limited vertical movement, whereby upon its coming over the cutting-die 67 it may be depressed thereon for the purpose of smoothly lifting the wrapper from said die, and thereafter upon ascending and being moved to a point above the perforated portion of the rolling-apron 123 it may be depressed to deliver the cut wrapper smoothly upon said apron. The pneumatic wrapper-carrier 163 consists of the tube 181, one end of which carries the perforated nozzle 180, while the other end is pivotally mounted within the air-box 182, (see Figs. 13 and 15,) the said box being by means of the pipe 162 connected with the box 159 and through said box with the pipe 160, leading to the main suction-pipe 74. The lower portion of the pipe 181 of the pneumatic wrapper-carrier 163 is reduced to the form of a sleeve 183, which extends downward through the air-box and is held by means of a collar and screw 184, as shown in Fig. 13. Above the sleeve portion 183 of the pipe 181 the said pipe is, within the air-box 182, provided with openings 185, whereby the air is permitted to be drawn through the said pipe 181 and find an exit through the openings 185 to the pipe 162, as illustrated by the arrows in Fig. 13. Immediately above the upper edges of the air-box 182 the pipe 181 has secured around it, but not to it, the rigid gear-wheel 186, which is fastened by a small screw (shown in Fig. 13) to an elevated hub cast with the bed-plate 65, and which gear 186 is in engagement with the rack 187 at the right-hand end of the pivoted lever 188, carried by the pneumatic wrapper-carrier, (see Figs. 11 and 13,) and also with the pinion 189 secured upon the lower end of the shaft 190, upon the upper end of which is a gear-wheel 191, as shown in Figs. 1, 37, 38, and 39, the latter gear-wheel being in engagement with the corresponding wheel 192, loose upon the upper end of the shaft 193, which is provided with the ratchets 194 to engage the pawls 290 and 291 on the gear-wheel 192 and supporting-frame of said shafts, respectively. (See Figs 37, 38, and 39.)

The shaft 193 has upon its lower end a beveled gear-wheel 195, which engages the beveled gear-wheel 196, secured upon the horizontal shaft 197, which is provided upon its outer end with the wheel 198 for the pasting-belt 199, hereinafter referred to. The pivoted lever 188, having upon one end the rack 187, is provided upon its opposite end with the rack 200, which engages a rack 201, formed upon the side of the nozzle 180, as illustrated in Fig. 11. The nozzle 180 is rectangular in horizontal cross-section at its lower portion, and at its upper portion, as seen in Figs. 11 and 14, is made tubular, and this tubular portion enters the lower circular end of the pipe 181 of the pneumatic wrapper-carrier 163. The nozzle 180 is directly secured upon the pivotal rod 202, which extends from a cross-bar within said nozzle to a point above the left-hand end or outer bend of the pipe 181, as illustrated in Fig. 14. The nozzle 180 is adapted, by reason of its form and means of connection with the pipe 181, to have a pivotal movement under the action of the lever 188 during the oscillating or swinging movement of the carrier 163, and the purpose of allowing such movement in the nozzle 180 is to adapt it to rest squarely upon the cutting-die 67, as illustrated in Fig. 12, and then being moved over the apron 123, and to deposit the cut wrapper transversely across the same, as illustrated in Fig. 11.

It will be observable upon reference to Figs. 11 and 12 that when the pipe 181 of the pneumatic wrapper-carrier 163 is moved to cause the nozzle 180 to pass frontward over the die 67 the rack 201, moving against the rack 200 of the lever 188, will cause the nozzle 180 to be turned within the lower end of the pipe 181 until it assumes the position in which it is illustrated in Fig. 12, permitting it to come into alignment with the die 67, and that when said pipe 181 is moved to cause the nozzle 180 to travel to its position over the rolling-apron 123 the rack 201 on said nozzle, in conjunction with the toothed lever 188, will cause the said nozzle to have a pivotal movement within the lower end of the pipe 181 and assume the position in which it is illustrated in Fig. 11—transversely across the apron. The swinging movement of the pipe 181 causes the rack 187 of the lever 188 to move against the rigid gear-wheel 186, and thus said lever 188 is compelled to turn on its pivot sufficiently to insure, through the racks 200 and 201, the due axial movement, above described, of the nozzle 180. The gear-wheel 186 being rigid also has the effect, when the air-tube 181 is moving (and carrying the shafts 190 and 193,) of creating the movement of the pinion-wheel 189, shaft 190, gear-wheel 191, gear-wheel 192, and shaft 193, the latter, however, only moving when the pawl 290 on said gear 192 is in engagement with the upper ratchet secured upon said shaft 193, which, as will be observed in Fig. 1, takes place only during the rearward movement of the nozzle 180.

The purpose of the gear-wheels connected with the gear-wheel 186, as just above described, is at the proper time to impart a rotary motion to the belt-wheel 198 for the purpose of causing the belt 199 to have a definite traveling motion.

While the nozzle 180 is moving from the position shown in Fig. 12 to the position shown in Figs. 1 and 11 the gear-wheel 186 will revolve the shaft 190 and through the gear-wheel 191 on said shaft impart a revolving motion to the gear-wheel 192, which being at such time by means of its pawl 290 locked to the upper ratchet on the shaft 193 will cause the latter and the beveled gear-wheels 195 and 196 to have a revolving motion and impart the same through the shaft 197 to the wheel 198 and belt 199, but during the forward motion of the nozzle 180 the pawl 290 on the gear-wheel 192 will slide over the teeth of the upper ratchet on the shaft 193 and the pawl 291 will lock the lower ratchet and shaft 193 stationary, and hence, although during the forward motion of the carrier 163 the gear-wheel 192 is revolved, the shaft 193, shaft 197, and belt-wheel 198 remain stationary. The belt 199 is thus given an intermittent traveling movement during the rearward motion only of the pneumatic wrapper-carrier 163. The belt-wheel 198 is substantially inclosed at one edge by means of the paste-receptacle 203, as clearly shown in Figs. 1 and 13, and said receptacle in addition to containing paste is provided with an adjustable brush 204, whose bristles are in position to remain in contact with the exterior surface of the belt 199 as it passes over the wheel 198, as shown in Fig. 13, for the purpose of removing all superfluous paste from said belt prior to its escape at the lower end of said receptacle 203. The receptacle 203 is somewhat triangular in outline and is rigidly secured to a rod or arm 205, extending toward the right from the pneumatic wrapper-carrier 163, and said receptacle moves with said carrier during its oscillating movements. The belt 199 is taut upon the belt-wheel 198 and the wheels 206 and 207, as shown in Fig. 13, the said wheel 206 being at the front or outer portion of the said arm 205, carried by the pneumatic wrapper-carrier 163, and the right-hand end of which supports the paste-receptacle 203 over the wheel 198 and also the bearings for the shafts 190 and 193. The arm 205 is secured by means of a screw 208 to the carrier 163, Figs. 13 and 14, and is provided with the sleeves 209, which support the plunger-frame 210, having upon its lower edge the rubber or other soft material 211 and at its upper portion the cross-bar 212, which is connected with the lower portion of the plunger by means of rods 213, carrying the coiled springs 214, the tension of which is exerted to lift the soft material 211, with the frame 210, upward clear of the belt 199. As the belt 199 travels over its rollers 198, 206, and 207 it will upon its passage through the receptacle 203 become coated with the paste provided for the edge of the wrappers. The plunger-frame and soft material or pad 211 will remain in their upward position under the influence of the springs 214 at all times except when the nozzle 180 is about to pass over the cutting-die 67, and at such time, as shown in Fig. 14, the said frame 210 is depressed to cause the pad 211 to press the then stationary belt 199 upon the edge of the wrapper resting upon the cutting-die 67, whereby sufficient of the paste is caused to adhere to the wrapper for the purpose of securing the latter around the filler-tobacco. Immediately upon the frame 210 and pad 211 ascending and thus clearing the belt 199 from the wrapper the nozzle 180 will move directly over the said die 67 and be caused to descend upon and remove the wrapper from the same.

The mechanism for causing the vertical movement of the nozzle 180 and plunger-frame 210 is illustrated more clearly in Figs. 13 and 15, in which it will be observed that a tube 215 ascends through the right-hand end of the pipe 181 and contains within it a rod 216, the latter resting upon a lever 217 and having at its upper end the collars which receive between them the bifurcated right-hand end of the pivoted lever 218, the left-hand end of said lever being also bifurcated and held between collars on the upper end of the rod 223, connected with the plunger-frame 210, as illustrated in Fig. 13. It will be obvious that upon the lever 217 pressing the rod 216 upward the latter acting through the lever 218 and rod 223, will depress the plunger-frame 210 and cause the pad 211 to press the belt 199 upon the edge of the wrapper resting upon the die 67, and upon the lever 217 lowering from the rod 216 the weight of the latter, assisted by the springs 214, will instantly elevate the plunger-frame and re-establish the intermediate parts into their initial position. The lower end of the tube 215 is provided with the shoulder or collar 219, resting upon the lever 220, while at the upper end of said tube 215 are the collars 221, which receive the bifurcated right-hand end of the pivoted lever 222, which has at its left-hand end the bifurcated arms fitting between the collars at the upper end of the rod 202, which carries at its lower end the nozzle 180. When the lever 220 is turned upward against the collar 219 it will elevate the tube 215 and thereby through the lever 222 and rod 202 cause the descent of the nozzle 180 upon the die 67 or upon the rolling-apron 123, according to whether the said nozzle is at the time over the said die or said apron, and when the lever 220 lowers from said tube 215 the weight of the latter, aided by the spring 292, will elevate the nozzle 180. The levers 218 and 222 are operable independently of each other and in the proper operation of the machine. The lever 218, which serves to depress the plunger 210, has its movement in advance of the movement of the lever 222, which through its connections operates the nozzle 180.

The pneumatic wrapper-carrier 163 receives its oscillating motion from the reciprocating carriage 145, to which it is connected by the link 224, which is pivotally secured to both the said carriage and said carrier and may be adjusted as to its length by means of the nut 225. The plunger-frame 210 is operable from the shaft 226, which carries the gear-wheel 147, above referred to, and is provided on its left-hand end with the plate 227, carrying the pivoted finger 229, which during the revolution of the shaft 226 is adapted to come into contact with the upper end of the stud 230, secured at the rear end of the reciprocating rod 231, as shown in Fig. 2, which rod 231 is mounted in sleeves and is provided with the coiled spring 232, whose tension is to force the rod 231 rearward to the position in which it is illustrated in Fig. 2.

The rod 231 is connected by a pitman 233 with the upper end of the rocking lever 234, which is secured upon the rock-shaft 235, extending across the front end of the machine within the sleeve or tubular rod 236, and which rock-shaft 235 and tubular rod or sleeve 236, respectively, carry the lever-arms 217 and 220, which, as above described, are respectively below the vertical rod 216 of the pasting mechanism and the sleeve 215 of the pneumatic wrapper-carrier mechanism, as indicated by dotted lines in Fig. 1 and full lines in Figs. 13 and 15. Upon the plate 227, secured upon the rock-shaft 226, is provided a pin 237, against which the inner end of the pivoted finger 229 may bear, while during the rotary motion of the shaft 226 the outer end of said finger is bearing against the vertical stud 230, secured upon the end of the rod 231. When the shaft 226 is revolving in the direction of the arrow shown in Fig. 2, the outer end of the finger 229, moving against the stud 230, will move said stud and rod 231 frontward, until the said stud has traveled sufficiently for the outer end of the finger 229 to have passed it, at which time the spring 232 will promptly return the rod 231 and stud 230 to their rear positions. (Shown in Fig. 2.) The forward movement of the stud 230 and rod 231 under the action of the finger 229 has the effect of moving the pitman-rod 233 forward and rocking the shaft 235 for the purpose of causing the lever 217 to move upward against and elevate the rod 216, and thereby, through the lever 218 and rod 223, depressing the plunger-frame 210 and causing the pad 211 to press the pasting-belt 199 upon the edge of the wrapper resting upon the cutting-die 67, as shown in Fig. 14. It is intended that the plunger-frame 210 shall remain depressed but a short space of time, and therefore immediately upon the end of the finger 229 passing the stud 230 the spring 232 will restore the rod 231, pitman 232, rocking shaft 235, and lever 217 to their former or initial positions, whereby the rod 216 is permitted to descend and the plunger-frame 210, with its pad 211, allowed to elevate from the belt 199. During the reverse movement of the shaft 226, for the purpose of returning the carriage 145 with the roller 142 rearward, the pin 229, being pivotally secured, will yield on its pivot and pass over the upper end of the stud 230, the spring 238 restoring the finger 229 against the pin 237 immediately upon said finger having passed rearward beyond the stud 230. The oscillatory movement of the sleeve or tubular rod 236 upon the rock-shaft 235 has the effect of moving the lever 220 upward against the collar 219, and thereby elevating the tube 215 and causing, through the lever 222, the depression of the nozzle 180 upon the wrapper held upon the cutting-die 67, and this depression of said nozzle occurs immediately after the plunger-frame 210 has been elevated and the pasting-belt 199 has been carried frontward beyond the vertical plane of the die 67. The mechanism for oscillating the sleeve or tubular rod 236 is shown in Fig. 2, and consists of the arm 293, secured to said sleeve, the connecting-rod 294, and the arm 295 on the rock-shaft 296, which is actuated by the cam 297 on the driving-shaft through the arm 298 and rod 299.

Intermediate the front end of the rolling-table 141 and the rear portion of the wrapper-cutting table 66 are provided the knives for trimming the opposite ends of the cigarette, and the buckets whereby the rolled cigarettes are removed from the rolling-apron 123 and carried downward to the lower or stationary knives preparatory to the descent of the oscillatory trimming-knives, and this mechanism, while illustrated in Figs. 1, 5, 6, and 7, is more fully and on a larger scale presented in Figs. 18 to 24, inclusive, in which 239 denotes the shaft upon which both the knives and the buckets are mounted, the oscillating knives being designated by the number 240 and being rigid on the shaft 239, while the buckets are not rigid upon the said shaft, but are rather firmly held by the friction caused by the interposition of a leather washer 241 upon said shaft intermediate the collar 242 and one end of the hub 245 of the said buckets, as shown in Fig. 19, the other end of said hub having a bearing against the stop or pin 300, as shown in Figs. 19 and 22. The stationary knives 243 are firmly secured by means of screws to a part of the frame of the machine and are immovable, while the knives 240 have an oscillating movement with the shaft 239 and the said buckets an intermittant rotary movement. The buckets are illustrated as being four in number and composed of the plates 244 (which radiate from and are rigid with the hub 245) and plates 246, which are pivotally secured to the rigid plates 244 and are provided with springs 247, whose tension is to retain the said plates 246 in an open position from the plates 244, as illustrated in Figs. 20 and 22. The plates 244 and 246 are provided at their meeting faces with the plates 248, which, when the said plates are open, as shown in Fig. 22, do not pass beyond each other, but form a base upon which the cigarette may rest, as illustrated in Fig. 20, and the arrangement of said plates 248 is such that upon the plates 246 closing toward the rigid plates 244 they will slide one over the other and still form a rest for the cigarette, although not of so extended a plane as when said plates 246 are in their open position Below the plates 248, secured to the pivoted plates 246, are the studs 249, which serve as stops to prevent the plates 246 from approaching so closely to the rigid plates 248 as to injure the cigarette held between said plates.

At the time when the rolled cigarette is ready to leave the rolling-apron 123, as shown in Figs. 7 and 34, it will, if not sticking to said apron by reason of the paste used in securing the wrapper, fall of its own specific gravity into the space formed between those plates 244 and 246, which may then be uppermost, as shown in Figs. 7 and 20, and if said cigarette should at said time adhere to the apron 123 it will be detached therefrom and caused to fall into said space between said plates by reason of the fact that upon the belt and cigarette reaching the position shown in Figs. 7 and 34 the buckets on the shaft 239 will have a slight reverse rotary motion toward the front of the machine, whereby the then upper plate 244 will be moved against the said rolled cigarette, detaching the latter from the apron and permitting it to fall into said space between said plate 244 and the adjoining pivoted plate 246.

After the cigarette has fallen between the plates 244 and 246, as above specified and as illustrated in Fig. 20, the hub 245 and series of buckets, with the oscillating knives 240, will revolve toward the rear of the machine, the buckets making a one-quarter turn, when they will be arrested, the cigarette being at this time held across the stationary knives 243, while the knives 240 make a slight further revolution, so as to carry their cutting-edges below the upper cutting-edges of the knives 243 and trim the ends of the cigarette, as illustrated in Fig. 23, after which the buckets will continue to revolve intermittently by one-quarter turns, the knives 240, however, being returned to their initial position. (Shown in Fig. 20.)

The shaft 239 receives its movement from the main driving-shaft through the arm 251, rod 252, arm 253, shaft 254, segment 255 on said shaft 254, and gear-wheel 256, which is rigidly secured on said shaft 239, as shown in Figs. 5, 18, and 19. The connections intermediate the gear-wheel 256 on the shaft 239 and the arm 251, which, as shown in Fig. 5, is mounted upon the auxiliary driving-shaft 91, are operated from the main driving-shaft through the instrumentality of the cam 257, Fig. 53, which causes the segment 255 to have an oscillating movement and the gear-wheel 256 an intermittent rotary movement. In front of the trimming-knives and series of buckets on the shaft 239 there is secured to the frame of the machine over the shaft 254, as illustrated more clearly in Fig. 18, the pivoted plate 258, which is adapted to have an oscillatory movement on its pivot 259, and under the guidance of the pin 260 and curved slot cut in said plate 258, and the purpose of which plate 258 is at the proper time to form an obstruction which prevents forward movement in the buckets on the shaft 239, Fig. 24. When, for instance, the series of buckets on the shaft 239 are in the position in which they are illustrated in Fig. 24, the point of the plate 258 will be at the lower side of the substantially-horizontal rigid plate 244, and when in this position it will prevent the buckets from rotating forward. A spring 261, acting through the arm 262, retains the plate 258 in its initial position, (shown in Fig. 24,) except when the tension of said spring 261 is overcome by the contact with the arm 262 of the forward portion of the roller-carriage 145 at the moment the latter has reached its forward movement and the rolling-apron 123 is in the position in which it is illustrated in Fig. 34, ready to drop the rolled cigarette. The principal object of the plate 258 is to prevent the series of buckets on the shaft 239 from turning forward when the knives 240 are returning from the position shown in Fig. 23 to the position shown in Fig. 24. There is a close frictional contact between the parts secured upon the shaft 239, and in the absence of the plate 258 or some equivalent device the buckets, instead of remaining stationary during the return of the knives 240 to their upward position, would be inclined to move with said knives on the shaft 239. During the forward motion of the carriage 154, apron 123, and roller 142, the buckets and knives 240 will be about in the position in which they are illustrated in Fig. 24, and at such time the rear end of the plate 258 is directly below the rigid plate 244, as illustrated in said Fig. 24. When the carriage 145 has about reached the end of its forward travel, it will come into contact with the arm 266, moving it forward and turning the plate 258 away from its contact with the plate 244, thus freeing the buckets on the shaft 239 and permitting the buckets and knives 240, under the action of the cam 257 on the main driving-shaft, to have a slight forward motion, in order that the rigid plate 244, then uppermost, may strike against the cigarette possibly adhering to the apron 123 and cause the same to fall into the space between the uppermost plates 244 and 246, this slight forward movement of the buckets being simply to cause the plate 244 to wipe the cigarette from the apron 123 and permit it to fall into said space between said plates 244 and 246, as shown in Fig. 20.

Upon the shaft 254, which, as has been explained, receives an oscillatory movement from the main driving-shaft through the cam 257 and intermediate connections, is secured the cam 263, which, through a pin 264, acts upon the arm 265 to lift the same clear of the buckets on the shaft 239, for the purpose of permitting said buckets to move rearward toward the knives 243 after the carriage 145 and roller 142 have gone rearward, leaving the cigarette in the position shown in Fig. 20. The arm 265 being in its elevated position, as shown in Fig. 24, the plates 244 and 246, forming the buckets on the shaft 239, may revolve rearward without striking the said arm 265; but when the said arm 265 is in its lower position, as shown in Fig. 23, it will prevent the rearward motion of the said buckets, and, as illustrated in Fig. 23, it will be observed that the arm 265 arrests the buckets at the end of their one-quarter turn and while the cigarette is in contact with the stationary knives 243, the purpose being to thus arrest the buckets and the cigarette while the knives 240 are completing their downward motion to trim the ends of said cigarette. After the ends of the cigarette have been trimmed the knives 240 return to their upward position (shown in Fig. 20) and the arm 265 elevates under the action of the cam 263, while the plate 258, as shown in Fig. 24, prevents the return of the buckets with the knives 240. When the buckets on the shaft 239 are approaching the position in which they are illustrated in Fig. 23 with a cigarette between one pair of the plates 244 and 246, the finger 266, carried by the loop 267 on said shaft, closes the pivoted plate 246 against the cigarette resting at such time on the plate 244, thus causing the cigarette to be firmly held between the plates 244 and 246 while its ends are being trimmed by the knives 240, as illustrated more clearly in Figs. 23 and 26. The finger 266, with its loop 267, is substantially inclosed in a casing 268 and is given a spring-tension outward by reason of the coiled spring 269 retained upon the pin 270, secured to said loop 267. The upper outer end of the finger 266 is curved or cam-shaped, and the lower edges of the plates 244 and 246 adjacent to said finger 266 are rounded, in order that during the upward movement of the knives 240 and said finger the said curved edges of the plates 244 and 246 may depress the said finger 266 with its loop inward, as illustrated in Fig. 25, the spring 269 at such time becoming compressed. The finger 266, with its casing 268, turns upward and forward with the knives 240, and since the buckets do not thus move with the knives 240 the finger 266 must pass below the edges of the plates 244 and 246, and hence the elongated loop 267 and spring 269 are provided, in order that the said finger 266 may pass upward below the edges of the plates 244 and 246 without disturbing the same. When the finger 266 is not in contact with the lower edges of the plates 244 and 246, the spring 269 will project the said finger outward through the slot in the casing 268, as illustrated in Fig. 26, thus leaving said finger in a position in which, upon the next movement of the knives 240 downward and rearward to trim a cigarette, it, the said finger, may come into contact with the pivoted plate 246 of the bucket holding the cigarette to be trimmed and close said plate toward the plate 244 for the purpose of firmly binding the cigarette preparatory to its being properly trimmed. The casing 268, carrying the finger 266, is not rigid on the shaft 239, while the knives 240 are rigid on said shaft and are connected with the said casing by the spring 250, so that as the knives 240 descend, as shown in Fig. 23, they will pull through the spring 250 on the casing 268 and turn the latter sufficiently to cause the depression of the finger 266 against the plate 246, as shown in Figs. 23 and 26.

When the knives 240 turn upward again, the pin 301 on the hub thereof meets the pin 302 on the casing 268, and thereby causes said casing to follow the movement of said knives for the purpose of turning the finger 266 upward free of the plate 246 and from the position shown in Fig. 23 to the position shown in Fig. 24. As soon as the finger 266 starts upward from the position it occupies in Figs. 23 and 26 to its initial position (shown in Figs. 20 and 24) the spring 247, connected with the plate 246, against which the finger 266 had been exerting its force, will restore the said plate 246 to its outward position, in order that during the continued movement of the buckets on the shaft 239 the trimmed cigarette may escape and fall upon any suitable chute by which it may be desired to lead the finished cigarettes from the machine.

The plate 258 is of light metal and will yield upwardly at its outer or rear end to a sufficient extent to permit the plates 244 and 246 to pass it while said plates are turning rearward to carry the cigarette to the stationary knives 243; but said plate 258, being mounted on a solid support, will not, when in the position shown in Fig. 24, yield downward under any pressure of the plates 244.

The reciprocating roller 142 is shown on an enlarged scale in Figs. 49 and 50, in which it will be seen that the roller-shaft 143 is provided within the roller with the pinion 303 and that the roller 142 carries within it the fixed worm 304, which engages said pinion and which when turned will cause the roller to have a rotary movement on the shaft 143 for the purpose of winding or unwinding the apron 123 to lengthen or shorten the latter, as circumstances may require. The worm 304 is permitted to revolve, but is otherwise held stationary in its relation to the roller 142 by means of the screw 305, and hence when the worm is rotated in engagement with the pinion 303 the roller 142 is compelled to have an axial rotation on the shaft 143 and adjust the operative length of the apron 123 accordingly.

The left-hand end of the main driving-shaft 78 is provided with an ordinary well-known automatic clutch 306, Figs. 1 and 2, or any suitable clutch, which will automatically stop the machine at the end of each revolution of the driving-shaft and permit the machine to be started again by the pressure of the foot upon the treadle 307.

The shaft 226, carrying the gear-wheel 147, which reciprocates the carriage 145, receives its motion from the cam 308 on the main driving-shaft 78 through the segmental rack 309 and pinion 310, the latter being rigid on said shaft 226, as shown in Figs. 2, 9, 10, 40, and 51.

The operation of the various parts of the machine has been so fully described hereinbefore in connection with the explanation of the construction of said parts that it is believed a further detailed description of the operation of the machine is unnecessary. The filler-tobacco will be comparatively smoothly and uniformly spread upon the feeding-belt 81 and by the said belt carried forward to the roller 84, whence it will pass through the throat 95 to the shuttle 97, as indicated in Fig. 30, the forward feed of the tobacco being accomplished by intermittent movement, and the pressure of the tobacco entering the shuttle 97 and against the plunger 112 acting to force the arm 113 against the stop 122, whereby the catch 101 is released from the rod 99, and the latter, with the plate 98 and segmental plate 96, is thereby allowed to elevate and stop the feeding mechanism. As soon as sufficient quantity of the filler-tobacco for a cigarette has entered the shuttle 97, the rod 99 will be released, as above described, and the feeding mechanism stopped, and at this time the knife 103 will descend and sever that portion of the filler-tobacco within the shuttle 97 from the main body thereof on the belt 81, and the carriage 128, carrying the shaft 108 and shuttle 97, will thereupon move transversely across the machine to the rolling-apron 123, as shown in Fig. 11. After the shuttle 97, containing the charge of filler-tobacco, reaches the rolling-apron 123 the stud 132 in the rigid collar 131 will, owing to the spiral form of the right-hand end of the groove 130 in the shaft 108, cause the said shaft and the shuttle 97 to turn downward to a substantially vertical position, as shown in Fig. 47 and deposit the charge of filler-tobacco upon the apron 123. The turning downward of the shuttle 97, as shown in Fig. 47, results in the plate or cover 106 of said shuttle being opened and the spring-pawl 110 being released from the ratchet 111, whereby the spring 114 is permitted to force the plunger 112 outward and downward and strip the filler-tobacco from the needles 121. When the filler-tobacco is being forced by the roller 84, through the throat 95 and into the shuttle 97, the tobacco will pass upon the rigid needles 121, which perform the function of preventing the tobacco, after the descent of the knife 103 and during the reciprocating movement of said shuttle, from being detached from or falling out of the said shuttle. After the charge of filler-tobacco has been deposited upon the rolling-apron 123, as shown in Fig. 47, the shuttle 97 will return to its former position in line with the feed-belt 81, and the knife 103 will ascend and at about the same time the cam 283 will carry its projection 102 against the lower end of the pivoted arm 98, and thereby effect the depression of the rod 99 into the position to engage the catch 101, thus lowering the segmental plate 96 and leaving the feed mechanism in condition for immediate operation. After the shuttle 97 has returned to the right from over the rolling-apron 123, the carriage 145 will start forward, carrying the roller 142 and auxiliary carriage 168, the latter being provided with the blade 169. The forward movement of the carriage 145 and roller 142 will form the loop or bight in the apron 123 and move the blade 169 over or to the front side of the said loop, which will inclose the filler-tobacco, the wrapper or binder having previously, by means of the pneumatic wrapper-carrier 181, been placed upon the perforated portion of said rolling-apron 123 in position to receive the filler-tobacco. The continued forward movement of the carriage 145 effects the rolling of the cigarette, while at the same time the retardation of the auxiliary carriage 168 maintains the loop in the apron of uniform size, as has been fully described above. The carriage 145 and roller 142 travel with the auxiliary carriage 168 a definite distance, and thereafter the said auxiliary carriage 168 and blade 169 are held back by means of the chain 173 and the weight thereto appended until the lug 176 on said carriage 145 comes into contact with the adjusting-stop 175, and thereby takes the strain of the weight annexed to the chain 173 and moves the auxiliary carriage 168 forward with the said carriage 145 during the remaining part of the movement of the latter.

The operation of the carriage 168, stop 175, and their connecting parts have been so fully described hereinbefore that a minute description of the same at this point seems to be unnecessary.

The pneumatic wrapper-carrier 163, being connected by a link with the carriage 145, moves with the same, and hence when the carriage 145 moves frontward the pneumatic wrapper-carrier will have a like movement, the purpose being upon every forward movement of the carriage 145 to form a cigarette, that the nozzle 180 of the pneumatic wrapper-carrier will come into alignment with the cutting-die 67 and lift a wrapper therefrom, and that upon every rearward movement of the carriage 145 the said nozzle 180 will carry the wrapper taken from the die 67 and deposit it upon the perforated portion of the rolling-apron 123. As may be seen in Fig. 1, there is sufficient space between the roller 142 and the pneumatic wrapper-carrier for the shuttle 97 to make its movement, hereinbefore described, and deposit the charge of filler-tobacco upon the apron 123 between said roller and said carrier. The forward motion of the carriage 145 after the shuttle 97 has returned to the right effects the formation of the cigarette and pushing of the pneumatic wrapper-carrier forward to the die 67, in order that said carrier may, upon its next rearward movement with the carriage 145, carry a wrapper to the rolling-apron 123 for the next cigarette to be rolled. When the carriage 145 has about reached its extreme forward position, as illustrated in Fig. 34, the apron 123 will have been sufficiently drawn outward to permit the escape of the cigarette, which will be caught between the plates 244 and 246, composing what I have termed "buckets," and be thereby carried to the stationary trimming-knives 243, where it will be held between said plates until the oscillating knives 240 descend and trim the ends thereof, after which the knives 240 will ascend, the plate 246 open from the plate 244, and the said buckets make a further partial revolution and permit the trimmed cigarette to escape into any suitable box or down any suitable chute which may be provided for the purpose.

It will be unnecessary here to repeat the specific operation of the plates 244 and 246 composing the buckets on the shaft 239, since the operation of the said plates with the trimming-knives has been fully described hereinbefore.

Just prior to the nozzle 180 of the pneumatic wrapper-carrier 163 descending upon the die 67 to lift the wrapper therefrom the pasting-belt 199 will be depressed upon the edge of the wrapper, as illustrated in Fig. 14, and hence the wrapper, upon being carried to the rolling-apron 123, will be provided with sufficient paste to cause it to adhere when wrapped upon the filler-tobacco. The pasting-belt 199 has an intermittent traveling movement, its movement occurring only during the rearward motion of the pneumatic wrapper-carrier 163, and said belt having no movement during the forward motion of said pneumatic wrapper-carrier. The belt 199 is thus held stationary as against any traveling movement on its rollers at the time it is to be depressed upon the wrapper located upon the die 67. The rolling-apron 123, die 67, and pneumatic wrapper-carrier 163 are connected with air-suction apparatus, whereby the leaf is held smoothly upon the die 67 during the cutting of the wrapper, and the wrapper is held smoothly upon said die until removed therefrom by the perforated nozzle 180 of the pneumatic wrapper-carrier 163, which, being in connection with air-suction, will smoothly hold the wrapper while conveying it to the perforated rolling-apron 123, and the latter being in connection with air-suction apparatus the said wrapper will be held smoothly thereupon while the cigarette is being rolled.

The suction apparatus is provided with suitable valves, whereby the air may be cut off from the die 67 when the wrapper-carrier 163 is to take the wrapper from said die and may be cut off from the wrapper-carrier 163 and turned upon the apron 123 when the latter is to take the wrapper from said carrier, the action of said valves being practically instantaneous, so that as one part is ready to take the wrapper the other part is prepared to release the same and the wrapper is not allowed to wrinkle or contract during its transfer from one part to another.

The capacity of the machine hereinbefore described is governed to a large extent by the operator's ability to cut the wrappers for the cigarettes, and experience has demonstrated that a skilled operator is able usually to cut about five thousand wrappers in a day of ten hours. Hence the usual capacity of the machine is about five thousand cigarettes a day, although it will be understood that with greater speed on the part of the operator in cutting the wrappers the capacity of the machine would be increased.

The machine forming the subject of this application has been in continuous use for a considerable period of time manufacturing cigarettes for the market.

The invention is not limited to the details of construction except as specifically pointed out in the claims, and the machine shown and described may be modified as to its mechanical details in many particulars without departing from the spirit of the invention.

What I claim as my invention, and desire to secure by Letters Patent, is—

1. In a cigarette making machine the intermittent tobacco feed mechanism, the cutter, and cigarette rolling mechanism, combined with the shuttle having a hinged lid and adapted to travel between said tobacco feed mechanism and said cigarette rolling mechanism and to deposit the severed charge of filler tobacco on the said rolling mechanism, means for opening and closing said lid, the grooved rod upon which said shuttle is secured, the carriage in which said rod is mounted, means for reciprocating said carriage, and the rigid stud entering the groove of said rod and effecting thereby the turning of said shuttle downward to deposit the charge of filler tobacco and then back to a horizontal position; substantially as set forth.

2. In a cigarette making machine the intermittent tobacco feed mechanism, the cutter, and cigarette rolling mechanism, combined with the reciprocating carriage for the shuttle, the grooved shaft mounted in and carried by said carriage, the rigid stud entering the groove of said shaft, and the shuttle mounted upon said shaft and adapted to travel therewith between said tobacco feed mechanism and the said rolling mechanism, the said shuttle being open at one edge to receive the filler tobacco and adapted thereafter, when turned downward by the action of said stud and groove, to discharge the severed charge of tobacco upon the said rolling mechanism; substantially as set forth.

3. In a cigarette making machine the intermittent tobacco feed mechanism, the cutter, and cigarette rolling mechanism, combined with the shuttle adapted to travel between said feed mechanism and said rolling mechanism and having a hinged side and a spring plunger provided with ratchet teeth, the pawl engaging said ratchet teeth and carried by the hinged side of said shuttle, means for holding said hinged side of the shuttle normally closed, means for freeing said pawl from said ratchet when said shuttle is over the rolling apron in position to discharge the severed quantity of filler tobacco, and means for reciprocating said shuttle and turning it downward to discharge the filler tobacco therefrom; substantially as set forth.

4. In a cigarette making machine the intermittent tobacco feed mechanism, the cutter, and cigarette rolling mechanism, combined with the shuttle adapted to travel between said feed mechanism and said rolling mechanism and composed of the opposite plates forming the receptacle, one of said plates being hinged, means for opening and closing said hinged plate, the yielding plunger within said shuttle, means for locking the plunger as it recedes under the pressure of the tobacco, means for freeing the said plunger to eject the tobacco when in position over the rolling mechanism, and means for reciprocating said shuttle and turning it downward to deposit the filler tobacco; substantially as set forth.

5. The feed belt and rollers, the pawl and ratchet mechanism for effecting the intermittent movement of said belt and rollers, the cutter for severing the charges of tobacco, the rod 99 and plate 96 connected with said pawl and ratchet mechanism for disengaging the pawl from the ratchet when in their upward position, the catch for retaining the said rod when in its lower position, the rock-shaft carrying said catch, and the stop connected with said catch, combined with means for rolling the cigarette, the shuttle adapted to travel between said feed mechanism and said rolling means and composed of the opposite plates forming a receptacle, the yielding plunger within and carried by said shuttle and having an arm in line with said stop and adapted under the pressure of the tobacco fed into the shuttle to engage said stop and free said catch from said rod for stopping the feed, and means for reciprocating said shuttle and turning it downward to discharge the filler tobacco; substantially as set forth.

6. In a cigarette making machine the intermittent tobacco feed mechanism, and cigarette rolling mechanism, combined with the cutter, the shuttle adapted to reciprocate between said feed mechanism and said rolling mechanism and to convey the separate charges of filler tobacco from the former to the latter, means for reciprocating said shuttle and turning it downward to discharge the filler tobacco therefrom, a yielding plunger within and carried by said shuttle, means for retaining the plunger at its inward position during the travel of said shuttle from the tobacco feed mechanism to the rolling mechanism, and means for freeing said plunger when the shuttle is turned downward; substantially as set forth.

7. In a cigarette making machine the intermittent tobacco feed mechanism, the cutter, and cigarette rolling mechanism, combined with the shuttle carriage, means for reciprocating the same from said feed mechanism to said rolling mechanism, the revoluble shaft mounted in said carriage and containing the cam-groove, the rigid stud entering said groove, and the shuttle mounted on said shaft, the yielding plunger in said shuttle, means for locking the plunger at its inward position, and means for freeing said plunger when the shuttle is in position over the said rolling mechanism, the said groove being of a form to turn the shuttle downward into a vertical position while over the rolling mechanism, and to restore the same to a horizontal position in line with the filler tobacco fed by said feed mechanism; substantially as set forth.

8. The tobacco feed mechanism having the traveling feed belt mounted on rollers, and the pressure roller above the forward roller upon which the feed belt is mounted, combined with the throat in line with said feed belt and the space between said rollers, mechanism for imparting to said feed belt and rollers an intermittent motion, the knife for severing the charges of filler tobacco, and being pivoted at one end, the cross bar below the bed of the machine and carrying the two vertical rods, one acting as a guide for said knife and the other connected with the outer end of said knife, means for elevating and depressing the said cross bar and rods, the shuttle adapted to receive the severed charges of filler tobacco, and means for reciprocating said shuttle from the feed mechanism to the rolling mechanism; substantially as set forth.

9. In a cigarette making machine the apron for rolling the cigarette, the reciprocating roller for said apron, the reciprocating carriage carrying said roller, means for reciprocating said carriage, and means for forming the loop in said apron and effecting the necessary pressure thereon while the filler tobacco is being rolled, combined with the oscillating pneumatic wrapper carrier tube pivotally mounted at one end and thence extending substantially transversely toward said apron, the link connecting the outer end of said tube with said carriage to secure the movement of the former from the latter, the perforated nozzle mounted on the outer end of said tube and connected to travel therewith, the die for cutting the wrappers, air suction apparatus connected with said die and said carrier, means for depressing said nozzle to enable the latter to take the cut wrapper from said die and again depressing said nozzle to deposit the wrapper upon said apron, and means for cutting off the air from said die when the wrapper is to be taken therefrom by said nozzle and for cutting off the air from said nozzle when the latter is to deposit the cut wrapper upon said apron; substantially as set forth.

10. In a cigarette making machine, the rolling apron, combined with the pneumatic wrapper carrier tube pivotally mounted at one end and thence extending substantially transversely toward said apron, the perforated nozzle axially pivoted upon the outer end of said tube, the wrapper cutting die, means for horizontally oscillating said carrier between said die and apron, means for turning the said nozzle axially on the end of said tube to bring it into proper alignment with said die and said apron, air suction apparatus connected with said die and said carrier, and means for cutting off the air from said die when the wrapper is to be taken by said carrier and for cutting off the air from the carrier when the latter is to deposit the cut wrapper upon said apron; substantially as set forth.

11. In a cigarette making machine, the rolling apron, the cutting die, and air suction apparatus connected with said die, combined with the oscillating pneumatic wrapper carrier provided upon its outer end with a pivotally secured and vertically movable perforated nozzle, means for oscillating said carrier, means for depressing the perforated nozzle upon said die and upon the said apron, means for turning the said nozzle axially into alignment with said die and said apron, air suction apparatus connected with said carrier, and means for cutting off the air suction from said die when the carrier is to take the wrapper, and from the carrier when the apron is to receive the wrapper therefrom; substantially as set forth.

12. In a cigarette making machine, the perforated rolling apron, and the wrapper table, combined with the pneumatic wrapper carrier having upon its outer end the perforated nozzle, means for causing said nozzle to convey the wrappers from said table to said apron, air suction apparatus connected with said carrier, the paste receptacle and intermittently traveling pasting belt connected with and carried by said carrier, the plunger also carried by said carrier, means for depressing the said plunger against said belt in advance of the carrier lifting the said wrapper and conveying it to the rolling apron, and means for releasing the suction from the said carrier when its nozzle is over the rolling apron; substantially as set forth.

13. In a cigarette making machine the rolling apron, and the cutting die, combined with the pneumatic wrapper carrier adapted to travel between said die and said apron and having upon its outer end the perforated nozzle, air suction apparatus connected with said carrier and said die, the intermittently traveling pasting belt carried by said carrier, the plunger also carried by said carrier and adapted to depress the said belt against the edge of the wrapper on said die, means for depressing the said nozzle upon the wrapper, and mechanism for cutting off the air from said die when the wrapper is to be elevated by said carrier and for cutting off the air from said carrier when the apron is to receive said wrapper; substantially as set forth.

14. In a cigarette making machine, cigarette rolling means, and the wrapper cutting die, combined with the oscillating pneumatic wrapper carrier having upon its outer end the pivotally secured perforated nozzle carrying upon one side a rack, the stationary gear at the retained end of said carrier, the pivoted lever carried by said carrier and having a rack at each end, one engaging the rack on said nozzle and the other the gear at the retained end of said carrier, means for oscillating said carrier between said die and said rolling means, and means for cutting off the suction from said carrier when said nozzle is over said rolling means; substantially as set forth.

15. In a cigarette making machine, cigarette rolling mechanism, combined with the pneumatic wrapper carrier adapted to have an oscillating movement and provided upon its outer end with the perforated nozzle, the paste receptacle, the belt wheel therein, the belt traveling over said wheel and a wheel at the outer portion of said carrier, the plunger adapted to depress said belt upon the wrapper, mechanism intermediate the said wrapper carrier and said belt wheel whereby the latter is set in motion from said carrier, and means for cutting off the suction from said carrier when the latter is to deliver a wrapper to the rolling mechanism; substantially as set forth.

16. In a cigarette making machine the wrapper table, and cigarette rolling mechanism, combined with the pneumatic wrapper carrier adapted to have an oscillating movement between said table and rolling mechanism and provided upon its outer end with the perforated nozzle; the paste receptacle, intermittently moving pasting belt and plunger connected with and carried by said carrier, means for depressing said plunger against said belt to press the latter against the wrapper, means for depressing said nozzle against the wrapper to lift the same and against the said rolling mechanism to deposit the same, means for oscillating said pneumatic wrapper carrier, means intermediate said wrapper carrier and said pasting receptacle for communicating motion to the pasting belt traveling through said receptacle, suction apparatus connected with said carrier, and means for cutting off the suction from said carrier when the latter is to deliver the wrapper to said rolling mechanism; substantially as set forth.

17. In a cigarette making machine, the wrapper table, and cigarette rolling mechanism, combined with the pneumatic wrapper carrier adapted to have an oscillating movement and provided upon its outer end with the perforated nozzle, suction apparatus connected with said carrier, the stationary gear at the retained end of said carrier, the pinion and shaft and gear wheel on said carrier and engaged by said gearing, the shaft connected at its lower end by gearing to the shaft of the paste wheel and at its upper end provided with a ratchet, the gear wheel on said last mentioned shaft provided with a pawl to engage said ratchet and being itself in engagement with the said gear wheel, the pasting belt on said carrier and adapted to have an intermittent motion imparted to it from said gear wheels and shafts, the paste receptacle through which the pasting belt travels, the plunger also on said carrier and adapted to depress the belt upon the wrapper, and means for cutting off the suction from said carrier when the latter is to deliver the wrapper to said rolling mechanism; substantially as set forth.

18. In a cigarette making machine, the rolling apron, combined with the pneumatic wrapper carrier tube having upon its outer end the perforated nozzle and being at its inner end pivotally mounted within the air chamber, suction apparatus connected with said chamber, means substantially as described for depressing the said nozzle to lift the wrapper and then to deposit the same upon the rolling apron, and means for cutting off the suction from said carrier when the latter is to deliver the wrapper to said apron; substantially as set forth.

19. In a cigarette making machine, the rolling table and rolling apron, combined with the reciprocating roller to which one end of said apron is secured, the shaft extending through said roller and provided within the same with the gear wheel, and the worm within the said roller at right angles to said shaft and in engagement with the said gear wheel; substantially as and for the purposes set forth.

20. In a cigarette making machine, the wrapper table and cigarette rolling mechanism, combined with a pneumatic wrapper carrier adapted to convey the wrapper from the wrapper table to the said rolling mechanism, suction apparatus connected with said wrapper carrier, the paste receptacle on said carrier and having at its lower end the belt wheel, the brush within said receptacle and having its bristles in near relation to said wheel, the pasting belt traveling over said wheel, a supporting wheel on said carrier and receiving the outer end of said belt, the plunger for depressing the said belt against the edge of the wrapper, mechanism for imparting to said belt an intermittent motion and means for cutting off the suction from said carrier when the latter is over said rolling mechanism; substantially as set forth.

21. In a cigarette making machine, means for rolling the wrapper around the filler tobacco to form the cigarette, combined with the stationary and oscillatory pairs of knives for trimming the ends of the cigarette, the series of pairs of plates forming buckets mounted upon the shaft of said oscillatory knives, one plate of each pair being hinged and having a spring tension outward from the other plate, means for closing said hinged plate against the rolled cigarette to be trimmed, means for retarding the revolving motion of said buckets while the cigarette is being trimmed, and means for returning the oscillatory knives to their upward position without affecting the said buckets; substantially as set forth.

22. In a cigarette making machine, means for rolling the wrapper around the filler tobacco to form the cigarette, combined with the stationary and oscillatory knives for trimming the ends of the rolled cigarette, the series of buckets mounted upon the shaft of said oscillatory knives and being composed of plates, one plate of each pair being hinged and having a spring tension outward, means for rotating said shaft to cause said buckets to have an intermittent revolving motion in one direction and a slight motion in the opposite direction for the purpose of detaching the cigarette from the rolling apron, means for returning the oscillatory knives to their upward position without affecting the said buckets, and means for retaining the said buckets in stationary position while the ends of the cigarette are being trimmed; substantially as set forth.

23. In a cigarette making machine, the mechanism for rolling the wrapper around the filler tobacco to form the cigarette, combined with the stationary and oscillatory knives for trimming the ends of the cigarette, the series of buckets on the shaft of said oscillatory knives and being formed of pairs of plates, one plate of each pair being hinged and having a spring tension outward, the finger adapted to close said hinged plates, means for stopping said buckets while the oscillatory knives travel onward to cut through the cigarette, means for returning said oscillatory knives to their upward position without moving said buckets and intermediate connections between said knives and the casing of said finger, whereby the latter is returned to its initial position by motion communicated to said casing from said knives; substantially as set forth.

24. In a cigarette making machine the mechanism for rolling the wrapper around the filler tobacco to form the cigarette, combined with the stationary and oscillatory knives for trimming the ends of the cigarette, the series of buckets mounted upon the shaft of said oscillatory knives and composed of the pairs of plates, one plate of each pair being hinged and having an outward spring tension; means for imparting to said series of buckets an intermittent motion in one direction with the oscillatory knives, means for returning the oscillatory knives to their upward position without disturbing said buckets, means for preventing the buckets from turning forward while the cigarette is being trimmed, means for closing the hinged plates of said buckets against the cigarette to be trimmed, and means for preventing said buckets from having reverse motion during the return of the said oscillatory knives to their upward position; substantially as set forth.

25. In a cigarette making machine the mechanism for rolling the wrapper around the filler tobacco to form the cigarette, combined with the stationary and oscillatory knives for trimming the ends of the cigarette, the series of buckets upon the shaft of said oscillatory knives and composed of the pairs of plates, one plate of each pair being hinged and having a spring tension outward; means for imparting movement to said buckets and oscillatory knives, means for arresting the movement of said buckets when the cigarette has reached the stationary knives without retarding the further movement of the oscillatory knives, and means for returning the oscillatory knives to their initial position without reversing the movement of the said buckets; substantially as set forth.

26. In a cigarette making machine the mechanism for rolling the wrapper around the filler tobacco to form the cigarette, combined with the stationary and oscillatory knives for trimming the ends of the cigarette, the series of buckets upon the shaft of said oscillatory knives and composed of the pairs of plates, one plate of each pair being hinged and having a spring tension outward, the pivoted arm and cam for arresting the buckets when the rolled cigarette has reached the stationary knives in position to be trimmed by the oscillatory knives, and the pivoted plate which prevents the reverse rotation of the said buckets except when turned out of alignment therewith; substantially as set forth.

27. In a cigarette making machine, the feed belt for filler tobacco, the rollers upon which said feed belt is mounted, the pressure roller above the foremost of said rollers, the intermeshing gear wheels upon the said pressure roller and the roller directly below the same, the gear wheel mounted upon the actuating shaft and engaging the gear wheel on the roller below said pressure roller, the ratchet on said actuating shaft, the toothed segment on said shaft and carrying at its outer end the pawl engaging said ratchet, the pivoted segment actuated from the driving shaft of the machine and engaging the said first mentioned segment, the plate adjacent to said ratchet and capable of vertical movement, the arm secured to said plate and having a spring tension upward, the cam for depressing said arm and plate, and the rod connected with said arm, combined with the pivoted catch adapted to engage said rod at its outer end, the knife for severing the charges of filler tobacco, the shuttle in line with the feed belt and adapted to receive the filler tobacco, the yielding plunger within said shuttle and having an arm adapted to relieve the said catch from said rod, the rolling apron, means for reciprocating said shuttle from said feed mechanism to said apron and turning the same downward when over said apron, for the purpose of depositing the severed charge of filler tobacco upon the apron; substantially as set forth.

28. In a cigarette making machine the rolling apron secured at one end and the reciprocating roller to which the other end of said apron is connected, combined with the reciprocating carriage carrying the said roller, the auxiliary carriage mounted and adapted to slide upon the first mentioned carriage and having the pressure blade, the rod and chain connected with said auxiliary carriage, the weight at the end of said chain, means for imparting a forward tension to said auxiliary carriage, the stop on said rod, and the lug on said main carriage and adapted to engage said stop and lift said weight after the said pressure blade has passed over the loop in the apron and said loop has been drawn down to size; substantially as set forth.

29. In a cigarette making machine the rolling apron secured at one end, and the reciprocating roller to which the other end of said apron is connected, combined with the main reciprocating carriage carrying said roller, the auxiliary carriage having the pressure blade and carried by and adapted to slide upon said main carriage, the rod and chain connected with said auxiliary carriage, the weight on the end of said chain, the coiled spring on said rod, the stop also on said rod, and the lugs on the main carriage at opposite sides of said stop; substantially as set forth.

30. In a cigarette making machine the rolling apron secured at one end, and the roller to which the other end of said apron is connected, combined with the main carriage carrying the said roller and adapted to reciprocate in line with the length of said apron, the auxiliary carriage mounted and adapted to slide upon said main carriage, and provided with the pressure blade, the rod and chain connected with said auxiliary carriage, the spring on said rod, the stop also on said rod, the light weight on the end of said chain, the heavier weight receiving the said light weight and adapted to be taken up by the same when the light weight has been drawn upward, the casing having an air vent at its lower end and receiving said weights and the lug on the main carriage adapted to contact with the said stop on the said rod and effect the lifting of the heavier weight after the loop in the rolling apron has been drawn down into size against the said pressure blade; substantially as set forth.

31. In a cigarette machine, the rolling apron secured at one end, the reciprocating roller to which the other end of said apron is secured, and the main carriage supporting said roller, combined with the auxiliary carriage mounted and adapted to slide upon said main carriage and provided with the pressure blade, the weight and chain connected with said auxiliary carriage, means for propelling said carriages simultaneously until said blade has passed over the loop in the apron, and then propelling the main carriage alone until said loop has been drawn down to size, and then again moving the carriages together to effect the rolling of the cigarette; substantially as set forth.

Signed at the city of New York, in the county and State of New York, this 7th day of November, 1894.

JOHN R. WILLIAMS.

Witnesses:
CHAS. C. GILL,
EDWARD D. MILLER.